United States Patent
Araki

(10) Patent No.: US 9,955,040 B2
(45) Date of Patent: Apr. 24, 2018

(54) IMAGE FORMING APPARATUS

(71) Applicant: CANON KABUSHIKI KAISHA, Tokyo (JP)

(72) Inventor: Ryuichi Araki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/404,811

(22) Filed: Jan. 12, 2017

(65) Prior Publication Data

US 2017/0214828 A1    Jul. 27, 2017

(30) Foreign Application Priority Data

Jan. 25, 2016 (JP) ................................. 2016-011258

(51) Int. Cl.

| H04N 1/401 | (2006.01) |
| H04N 1/113 | (2006.01) |
| H04N 1/00 | (2006.01) |
| H04N 1/06 | (2006.01) |
| H04N 1/50 | (2006.01) |

(52) U.S. Cl.
CPC ......... *H04N 1/401* (2013.01); *H04N 1/00068* (2013.01); *H04N 1/0671* (2013.01); *H04N 1/113* (2013.01); *H04N 1/506* (2013.01); *H04N 2201/0094* (2013.01)

(58) Field of Classification Search
None
See application file for complete search history.

(56) References Cited

U.S. PATENT DOCUMENTS

| 8,837,011 B2 | 9/2014 | Takikawa et al. . H04N 1/40093 |
| 2007/0053041 A1* | 3/2007 | Nakahata ............. G02B 26/124 |
| | | 359/216.1 |
| 2007/0188588 A1* | 8/2007 | Shimomura ........... H04N 1/506 |
| | | 347/233 |
| 2013/0038671 A1* | 2/2013 | Yoshida ............. G03G 15/0435 |
| | | 347/118 |
| 2017/0019560 A1 | 1/2017 | Horiuchi et al. ...... H04N 1/405 |
| 2017/0019562 A1 | 1/2017 | Furuta et al. .......... H04N 1/405 |
| 2017/0019563 A1 | 1/2017 | Araki ................... H04N 1/4052 |

FOREIGN PATENT DOCUMENTS

JP    2012-098622    5/2012

* cited by examiner

*Primary Examiner* — Thomas D Lee
(74) *Attorney, Agent, or Firm* — Fitzpatrick, Cella, Harper & Scinto

(57) ABSTRACT

An image forming apparatus, including: a deflection unit configured to deflect light beams emitted from light emitting points with a mirror face to form scanning lines in a second direction orthogonal to a first direction in which a photosensitive drum is rotated; a correction unit configured to correct an optical face tangle error of the mirror based on a deviation amount from a distance between the deflection unit and the photosensitive member; a calculation unit configured to calculate a positional deviation amount of the emitting points in the first direction; a transformation unit configured to transform a pixel position of an input image based on the positional deviation amount so that an interval between the scanning lines is a predetermined interval; and a filtering unit configured to obtain a pixel value of an output image based on the transformed pixel position of the input image.

10 Claims, 19 Drawing Sheets

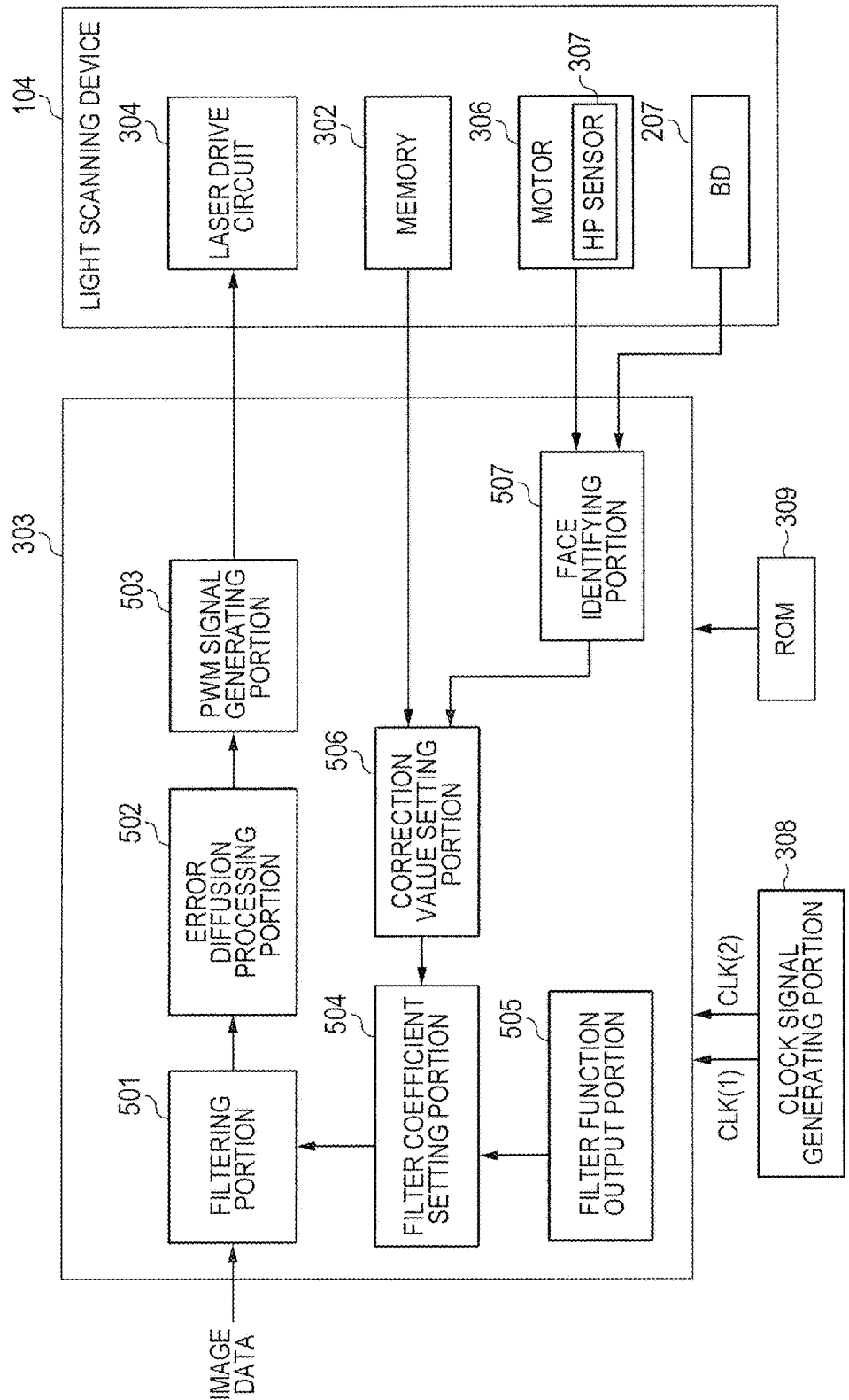

SCANNING POSITIONS ARE
SHIFTED IN ADVANCE DIRECTION

SCANNING POSITIONS ARE
SHIFTED IN RETURN DIRECTION

SCANNING POSITIONS ARE DENSE

SCANNING POSITIONS ARE SPARSE

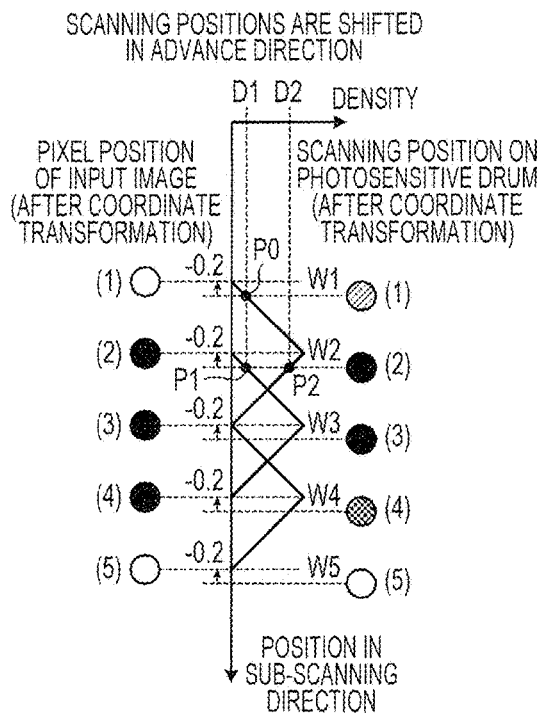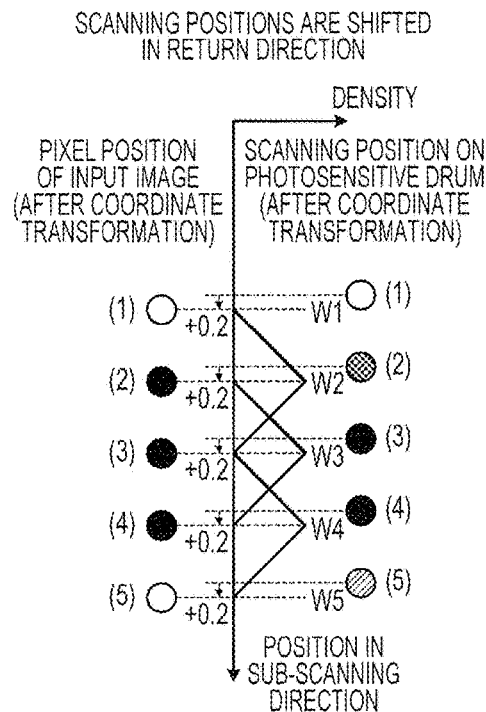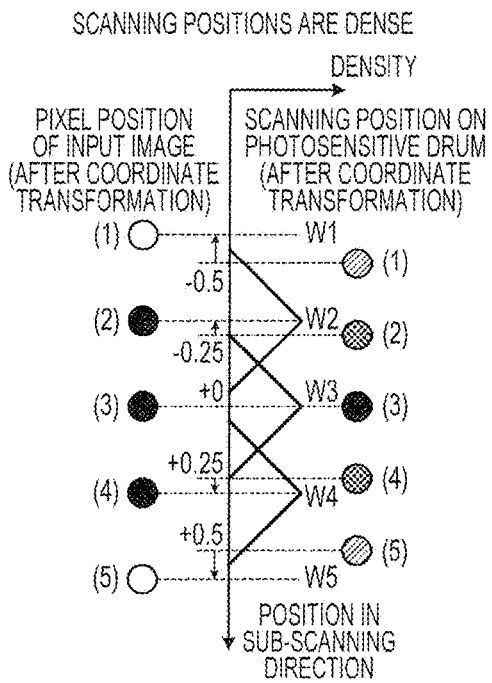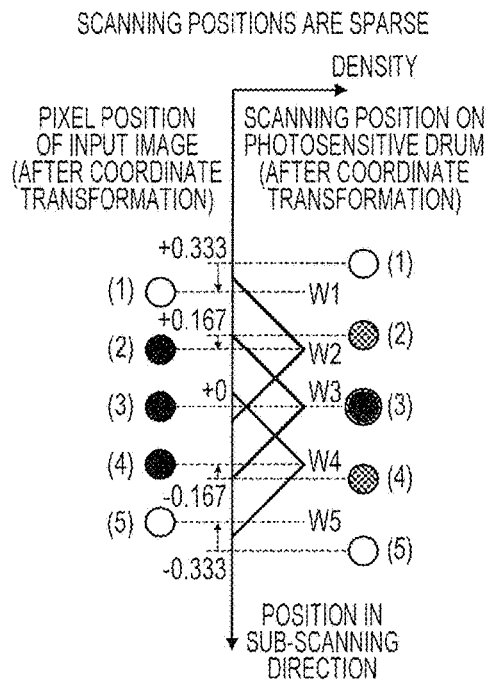

FIG. 15B
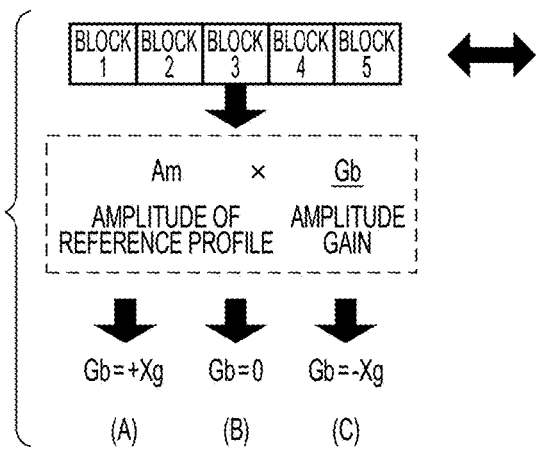
FIG. 15A
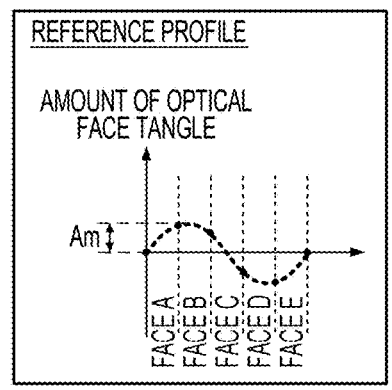
FIG. 15C
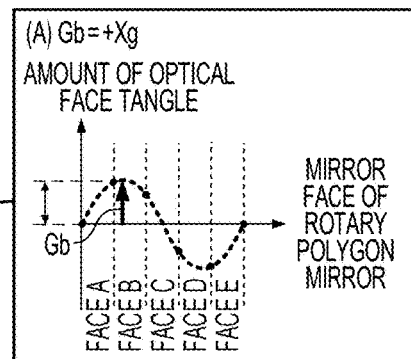
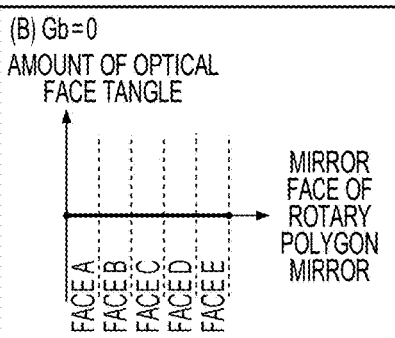
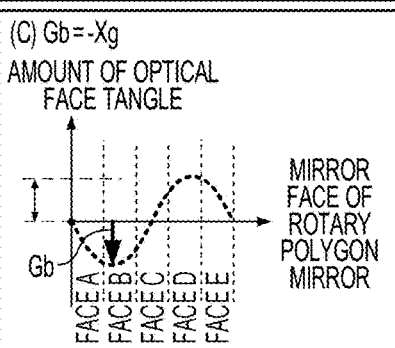
FIG. 15D
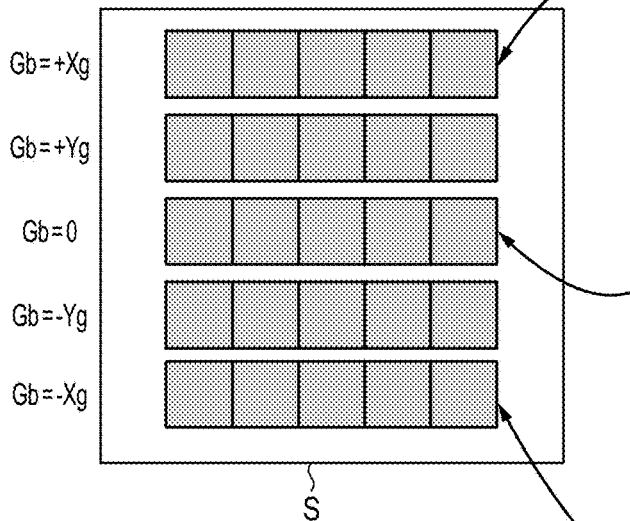

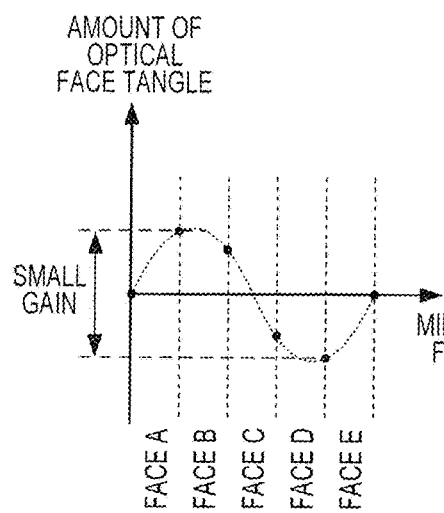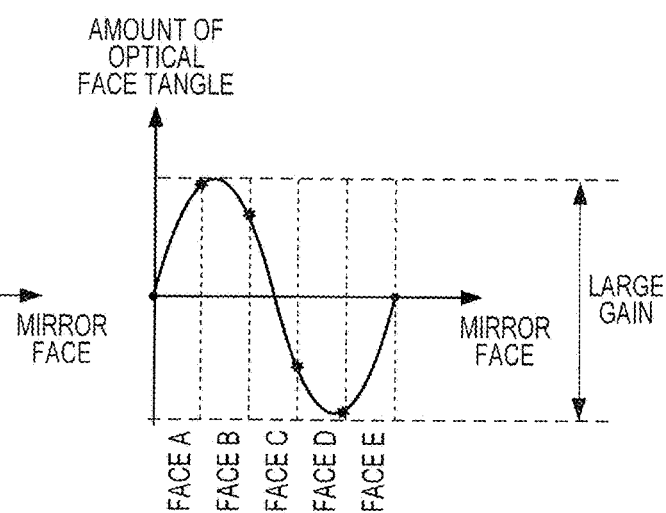
FIG. 16A  FIG. 16B
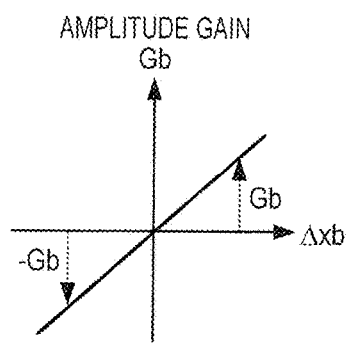
FIG. 16C

FIG. 18

|      | 0 | 1 | 2 | 3 | 4 | 5 | 6 | 7 | 8 | 9 | 10 | 11 | 12 | 13 | 14 | 15 |
|------|---|---|---|---|---|---|---|---|---|---|----|----|----|----|----|----|
| 0000 | 0 | 0 | 0 | 0 | 0 | 0 | 0 | 0 | 0 | 0 | 0  | 0  | 0  | 0  | 0  | 0  |
| 0001 | 0 | 0 | 0 | 0 | 0 | 0 | 0 | 0 | 0 | 0 | 0  | 0  | 0  | 0  | 1  | 1  |
| 0010 | 0 | 0 | 0 | 0 | 0 | 0 | 0 | 0 | 0 | 0 | 0  | 0  | 0  | 1  | 1  | 1  |
| 0011 | 0 | 0 | 0 | 0 | 0 | 0 | 0 | 0 | 0 | 0 | 0  | 0  | 1  | 1  | 1  | 1  |
| 0100 | 0 | 0 | 0 | 0 | 0 | 0 | 0 | 0 | 0 | 0 | 0  | 1  | 1  | 1  | 1  | 1  |
| 0101 | 0 | 0 | 0 | 0 | 0 | 0 | 0 | 0 | 0 | 0 | 1  | 1  | 1  | 1  | 1  | 1  |
| 0110 | 0 | 0 | 0 | 0 | 0 | 0 | 0 | 0 | 0 | 1 | 1  | 1  | 1  | 1  | 1  | 1  |
| 0111 | 0 | 0 | 0 | 0 | 0 | 0 | 0 | 0 | 1 | 1 | 1  | 1  | 1  | 1  | 1  | 1  |
| 1000 | 0 | 0 | 0 | 0 | 0 | 0 | 0 | 1 | 1 | 1 | 1  | 1  | 1  | 1  | 1  | 1  |
| 1001 | 0 | 0 | 0 | 0 | 0 | 0 | 1 | 1 | 1 | 1 | 1  | 1  | 1  | 1  | 1  | 1  |
| 1010 | 0 | 0 | 0 | 0 | 0 | 1 | 1 | 1 | 1 | 1 | 1  | 1  | 1  | 1  | 1  | 1  |
| 1011 | 0 | 0 | 0 | 0 | 1 | 1 | 1 | 1 | 1 | 1 | 1  | 1  | 1  | 1  | 1  | 1  |
| 1100 | 0 | 0 | 0 | 1 | 1 | 1 | 1 | 1 | 1 | 1 | 1  | 1  | 1  | 1  | 1  | 1  |
| 1101 | 0 | 0 | 1 | 1 | 1 | 1 | 1 | 1 | 1 | 1 | 1  | 1  | 1  | 1  | 1  | 1  |
| 1110 | 0 | 1 | 1 | 1 | 1 | 1 | 1 | 1 | 1 | 1 | 1  | 1  | 1  | 1  | 1  | 1  |
| 1111 | 1 | 1 | 1 | 1 | 1 | 1 | 1 | 1 | 1 | 1 | 1  | 1  | 1  | 1  | 1  | 1  |

IMAGE FORMING APPARATUS

BACKGROUND OF THE INVENTION

Field of the Invention

The present invention relates to an image forming apparatus, which is configured to correct distortion and uneven image density of an image during image formation of a two-dimensional image by the image forming apparatus, e.g., a digital copying machine, a multifunctional peripheral, or a laser printer.

Description of the Related Art

In electrophotographic image forming apparatus such as a laser printer and a copying machine, there has been generally known a configuration to form a latent image on a photosensitive member with the use of a light scanning device configured to perform scanning with a laser beam. In the light scanning device of a laser scanning type, a laser beam collimated with the use of a collimator lens is deflected by a rotary polygon mirror, and the deflected laser beam is formed into an image on a photosensitive member with the use of an elongated fθ lens. Further, there is known multi-beam scanning in which a laser light source having a plurality of light emitting points is included in one package so as to perform scanning with a plurality of laser beams simultaneously.

Meanwhile, in order to form a satisfactory image without uneven image density and banding, it is desired that distances between scanning lines of which positions to be scanned with a laser beam are adjacent to each other in a rotational direction of the photosensitive member be equal to each other. However, the distances between the scanning lines are varied due to a plurality of factors described below. The distances between the scanning lines on the photosensitive member are varied by, for example, a fluctuation in a surface speed of the photosensitive member, or a rotation speed fluctuation of a rotary polygon mirror. Further, the distances between the scanning lines are also varied by a variation in angle of mirror faces of the rotary polygon mirror with respect to a rotary shaft of the rotary polygon mirror and a variation in intervals between light emitting points arranged on a laser light source. To cope with uneven image density and banding caused by such factors, there has been proposed a technology of correcting banding by controlling an exposure amount of the light scanning device. For example, in Japanese Patent Application Laid-Open No. 2012-098622, there is described a configuration in which a beam position detection unit configured to detect a beam position in a sub-scanning direction is arranged in the vicinity of the photosensitive member, and the exposure amount of the light scanning device is adjusted based on scanning distance information obtained from a detected beam position, to thereby make banding less noticeable.

Due to factors such as a variation in dimensions of components forming the image forming apparatus, a laser beam emitted from a light scanning device has positional deviation from the position of an ideal focus in a focus depth direction. The amount of banding changes when the positional deviation occurs in the focus depth direction. FIG. 17A is a diagram for illustrating a state of an optical path formed based on the inclination of a mirror face of a rotary polygon mirror. For example, as illustrated in FIG. 17A, when a photosensitive member is deviated by ±α from a distance Lf which is a predetermined distance, a positional deviation of ±Δd occurs in a sub-scanning direction. As shown in FIG. 17C, the amount of optical face tangle of a just focus correction position is corrected by a lens 1001, but the amount is as shown in FIG. 17B or FIG. 17D at the position deviated by ±α from the distance Lf. Thus, when the positional deviation occurs in the focus depth direction, positional deviation is caused in the sub-scanning direction to change the amount of banding.

In the related art, when the positional deviation occurs in the focus depth direction due to the factors such as a variation in dimensions of components, a correction residual occurs because of an error in a correction amount. Even a configuration including a position detection unit configured to detect the position of a light beam has a problem in that, when the position of the position detection unit in the focus depth direction differs from the position of the photosensitive member in the focus depth direction due to, for example, a mounting error of the position detection unit, a detection error occurs, and banding cannot be eliminated completely.

SUMMARY OF THE INVENTION

The present invention has been made under the above-mentioned circumstances, and it is an object of the present invention to reduce uneven image density even when focus deviation of a laser beam radiated on a photosensitive member from a light scanning device occurs due to a variation on an image forming apparatus side and a mounting error of the light scanning device.

In order to solve the above-mentioned problem, according to one embodiment of the present invention, there is provided an image forming apparatus, comprising:

a light source comprising a plurality of light emitting points;

a photosensitive member configured to rotate in a first direction so that a latent image is formed on the photosensitive member by light beams emitted from the light source;

a deflection unit configured to deflect the light beam emitted from the light source with a mirror face and cause light spots of the light beams radiated on the photosensitive member to be moved in a second direction orthogonal to the first direction to form scanning lines;

a storage unit configured to store information on positional deviation of the plurality of light emitting points in the first direction and information on an optical face tangle error of the mirror face of the deflection unit in accordance with the second direction;

a correction unit configured to correct the information on the optical face tangle error stored in the storage unit, based on a deviation amount from a predetermined distance between the deflection unit and the photosensitive member;

a calculation unit configured to calculate a positional deviation amount based on the information on the positional deviation stored in the storage unit and the information on the optical face tangle error corrected by the correction unit;

a transformation unit configured to transform a position of a pixel of an input image by performing coordinate transformation based on the positional deviation amount calculated by the calculation unit so that an interval between the scanning lines on the photosensitive member is a predetermined interval; and a filtering unit configured to obtain a pixel value of a pixel of an output image by subjecting a pixel value of the pixel of the input image to a convolution operation based on the position of the pixel of the input image after the coordinate transformation.

Further features of the present invention will become apparent from the following description of exemplary embodiments with reference to the attached drawings.

BRIEF DESCRIPTION OF THE DRAWINGS

FIG. 2 is a block diagram of the image forming apparatus of the first and second embodiments.

FIG. 13A, FIG. 13B, FIG. 13C, and FIG. 13D are each a diagram for illustrating the filtering for each classification of positional deviation of the first and second embodiments.

FIG. 15A, FIG. 15B, FIG. 15C, and FIG. 15D are each a test chart of the first embodiment.

FIG. 16A and FIG. 16B are each a graph for showing a relationship between an amplitude gain and an amount of optical face tangle of the second embodiment.

FIG. 16C is a graph for showing a relationship between an amplitude gain and focus distance information.

FIG. 18 is a diagram for showing a conversion table for converting image data (density data) into drive data for generating a PWM signal.

DESCRIPTION OF THE EMBODIMENTS

The embodiments will be described in detail below in an illustrative manner with reference to the drawings. A direction of an axis of rotation of a photosensitive drum, which is a direction in which scanning is performed with a laser beam, is defined as a main scanning direction which is a second direction, and a rotational direction of the photosensitive drum, which is a direction substantially orthogonal to the main scanning direction, is defined as a sub-scanning direction which is a first direction.

<Change in Amount of Banding Caused by Positional Deviation in Focus Depth Direction>

Figure 17A:
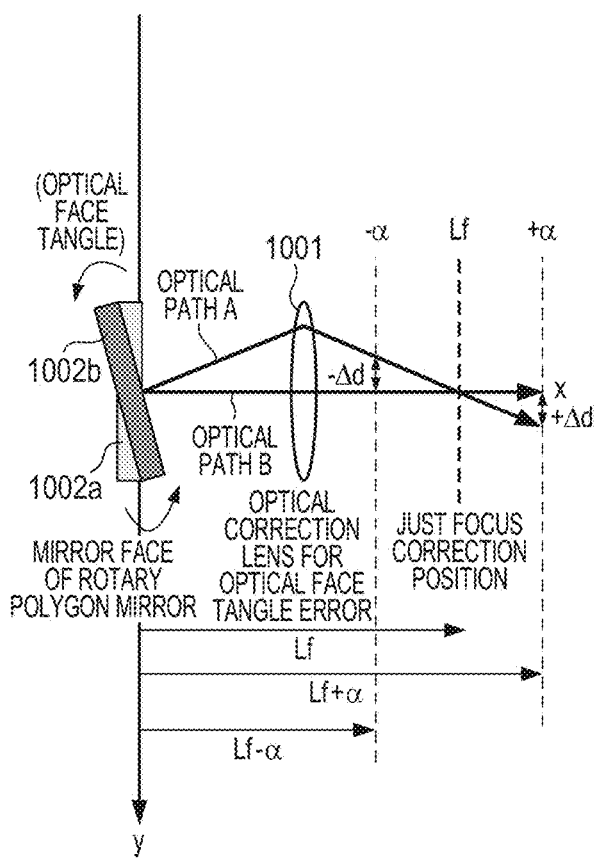
FIG. 17A, FIG. 17B, FIG. 17C, and FIG. 17D are each a diagram for showing a relationship between a mirror face of a rotary polygon mirror and an amount of optical face tangle thereof of the related art.

A relationship between the above-mentioned positional deviation in the focus depth direction and banding will be described in detail. Due to factors such as a variation in dimensions of components forming an image forming apparatus, a laser beam emitted from a light scanning device has positional deviation from the position of an ideal focus in the focus depth direction. The amount of banding changes when the positional deviation occurs in the focus depth direction. A relationship between the positional deviation in the focus depth direction and the banding will be described later. FIG. 17A is a diagram for illustrating a state of an optical path formed based on the inclination of a mirror face (reflection face) of a rotary polygon mirror. FIG. 17A is a diagram for illustrating a photosensitive drum 102 of FIG. 1B described later when viewed from a rotation axis direction. Based on the state in which the mirror face of the rotary polygon mirror forms an ideal angle, the optical path of a laser beam reflected from a mirror face 1002a of the rotary polygon mirror in the ideal state is represented by an optical path B in FIG. 17A. The laser beam reflected from a mirror face 1002b of the rotary polygon mirror which is inclined from the ideal angle and has an optical face tangle error is radiated on a photosensitive member through an optical path A at a different position from that of the optical path B. In general, in order to address the deviation of the optical path caused by the optical face tangle error of the mirror face of the rotary polygon mirror, an optical correction lens 1001 configured to correct an optical face tangle error by optically adjusting the position of an optical path is arranged. When the lens 1001 is arranged, the positional deviation caused by an optical face tangle error can be corrected at an ideal focus position (sometimes referred to as "just focus correction position").

In the example of FIG. 17A, when the photosensitive member is located at a position of the distance Lf based on the mirror face 1002a of the rotary polygon mirror in the ideal state, the optical path A is corrected by the lens 1001 to eliminate positional deviation. The lens 1001 corrects the optical path A of the laser beam reflected from the mirror face 1002b of the rotary polygon mirror which has an optical face tangle error, and corrects the positional deviation caused by an optical face tangle error at the distance Lf which is an ideal focus position. However, when the photosensitive member is deviated from the position of the distance Lf with respect to the mirror face of the rotary polygon mirror, the positional deviation cannot be eliminated by the lens 1001. Here, the distance from the mirror face of the rotary polygon mirror to the photosensitive member is represented by a distance "x".

For example, as illustrated in FIG. 17A, when the photosensitive member is deviated by +a from the distance Lf, the distance to the photosensitive member is X=Lf+α. In this case, the optical path A of the laser beam reflected from the mirror face 1002b of the rotary polygon mirror which has an optical face tangle error, has a positional deviation of +Δd in a sub-scanning direction ("y" direction of FIG. 17A) at the distance X=Lf+α. Further, for example, when the photosensitive member is deviated by −α from the distance Lf, the distance to the photosensitive member is X=Lf−α. In this case, the optical path A of the laser beam reflected from the mirror face 1002b of the rotary polygon mirror, which has an optical face tangle error, has a positional deviation of $-\Delta d$ in the sub-scanning direction at the distance X=Lf−α.

Figure 17B:
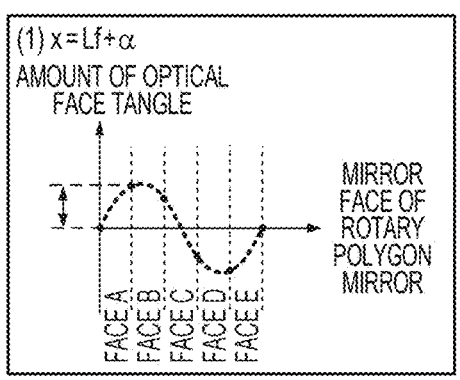
Figure 17C:
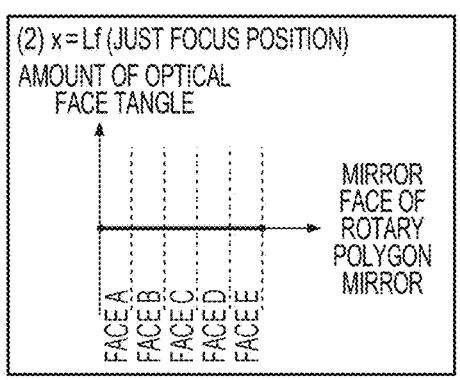
Figure 17D:
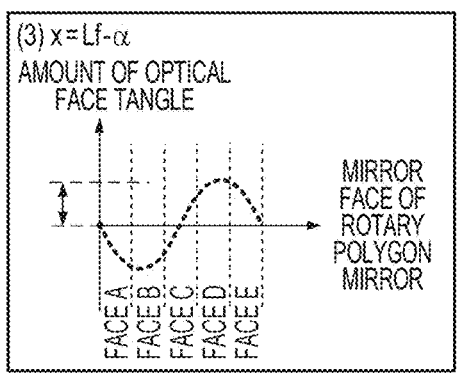

FIG. 17B to FIG. 17D are each a graph for showing the mirror face of the rotary polygon mirror in the horizontal axis and an amount of optical face tangle of the mirror face of the rotary polygon mirror in the vertical axis. Each of those graphs is hereinafter referred to as "optical face tangle error profile". FIG. 17B is an optical face tangle error profile when a focus is deviated by a distance "α" in a "+x" direction from the distance Lf which is the ideal focus position. FIG. 17C is an optical face tangle error profile of the distance Lf which is the just focus correction position, in which positional deviation is eliminated by the lens 1001. FIG. 17D is an optical face tangle error profile when a focus is deviated by the distance "α" in a "−x" direction from the distance Lf which is the just focus correction position. The amount of optical face tangle is reversed between positive and negative in FIG. 17B and FIG. 17D.

Further, a positional deviation amount $\Delta d$ in the sub-scanning direction increases along with an increase in deviation amount of a focus, that is, "a". Therefore, the amount of optical face tangle of the mirror face of the rotary polygon mirror is uniquely determined by the relationship between the angle of the mirror face of the rotary polygon mirror and the distance "x". Thus, when the positional deviation (α) occurs in the focus depth direction ("x" direction), positional deviation ($\Delta d$) occurs in the sub-scanning direction to change the amount of banding.

<Overall Configuration of Image Forming Apparatus>

Figure 1A:
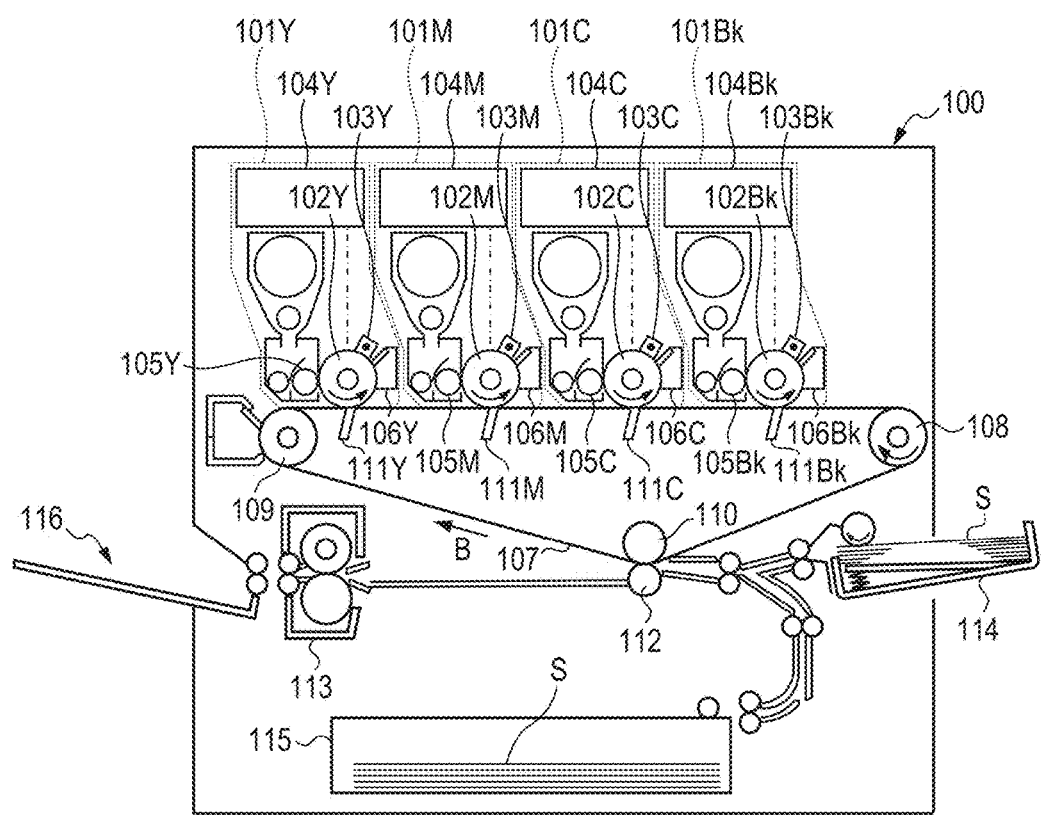
FIG. 1A is a view for illustrating an entire image forming apparatus of first and second embodiments.

FIG. 1A is a schematic cross-sectional view of a digital full-color printer (color image forming apparatus) configured to perform image formation by using toners of a plurality of colors. An image forming apparatus 100 according to an embodiment of the present invention will be described with reference to FIG. 1A. The image forming apparatus 100 includes four image forming portions (image forming units) 101Y, 101M, 101C, and 101Bk (broken line portions) respectively configured to form images of different colors. The image forming portions 101Y, 101M, 101C, and 101Bk form images by using toners of yellow, magenta, cyan, and black, respectively. Reference symbols Y, M, C, and Bk denote yellow, magenta, cyan, and black, respectively, and suffixes Y, M, C, and Bk are omitted in the description below unless a particular color is described.

The image forming portions 101 each include a photosensitive drum 102, being a photosensitive member. A charging device 103, a light scanning device 104, and a developing device 105 are arranged around each of the photosensitive drums 102. A cleaning device 106 is further arranged around each of the photosensitive drums 102. An intermediate transfer belt 107 of an endless belt type is arranged under the photosensitive drums 102. The intermediate transfer belt 107 is stretched around a drive roller 108 and driven rollers 109 and 110, and rotates in a direction of an arrow B (clockwise direction) illustrated in FIG. 1A while forming an image. Further, primary transfer devices 111 are arranged at positions opposed to the photosensitive drums 102 across the intermediate transfer belt 107 (intermediate transfer member). The image forming apparatus 100 according to the embodiment further includes a secondary transfer device 112 configured to transfer the toner image on the intermediate transfer belt 107 onto a sheet S being a recording medium and a fixing device 113 configured to fix the toner image on the sheet S.

An image forming process from a charging step to a developing step of the image forming apparatus 100 will be described. The image forming process is the same in each of the image forming portions 101, and hence the image forming process will be described with reference to an example of the image forming portion 101Y. Accordingly, descriptions of the image forming processes in the image forming portions 101M, 101C, and 101Bk are omitted. The photosensitive drum 102Y which is driven to rotate in the arrow direction (counterclockwise direction) illustrated in FIG. 1A is charged by the charging device 103Y of the image forming portion 101Y. The charged photosensitive drum 102Y is exposed by a laser beam emitted from the light scanning device 104Y, which is indicated by the dashed dotted line. With this operation, an electrostatic latent image is formed on the rotating photosensitive drum 102Y (on the photosensitive member). The electrostatic latent image formed on the photosensitive drum 102Y is developed as a toner image of yellow by the developing device 105Y. The same step is performed also in the image forming portions 101M, 101C, and 101Bk.

The image forming process from a transfer step will be described. The primary transfer devices 111 applied with a transfer voltage transfer toner images of yellow, magenta, cyan, and black formed on the photosensitive drums 102 of the image forming portions 101 onto the intermediate transfer belt 107. With this, the toner images of respective colors are superimposed one on another on the intermediate transfer belt 107. That is, the toner images of four colors are transferred onto the intermediate transfer belt 107 (primary transfer). The toner images of four colors transferred onto the intermediate transfer belt 107 are transferred onto the sheet S conveyed from a manual feed cassette 114 or a sheet feed cassette 115 to a secondary transfer portion by the secondary transfer device 112 (secondary transfer). Then, the unfixed toner images on the sheet S are heated and fixed onto the sheet S by the fixing device 113, to thereby form a full-color image on the sheet S. The sheet S having the image formed thereon is delivered to a delivery portion 116.

<Photosensitive Drum and Light Scanning Device>

Figure 1B:
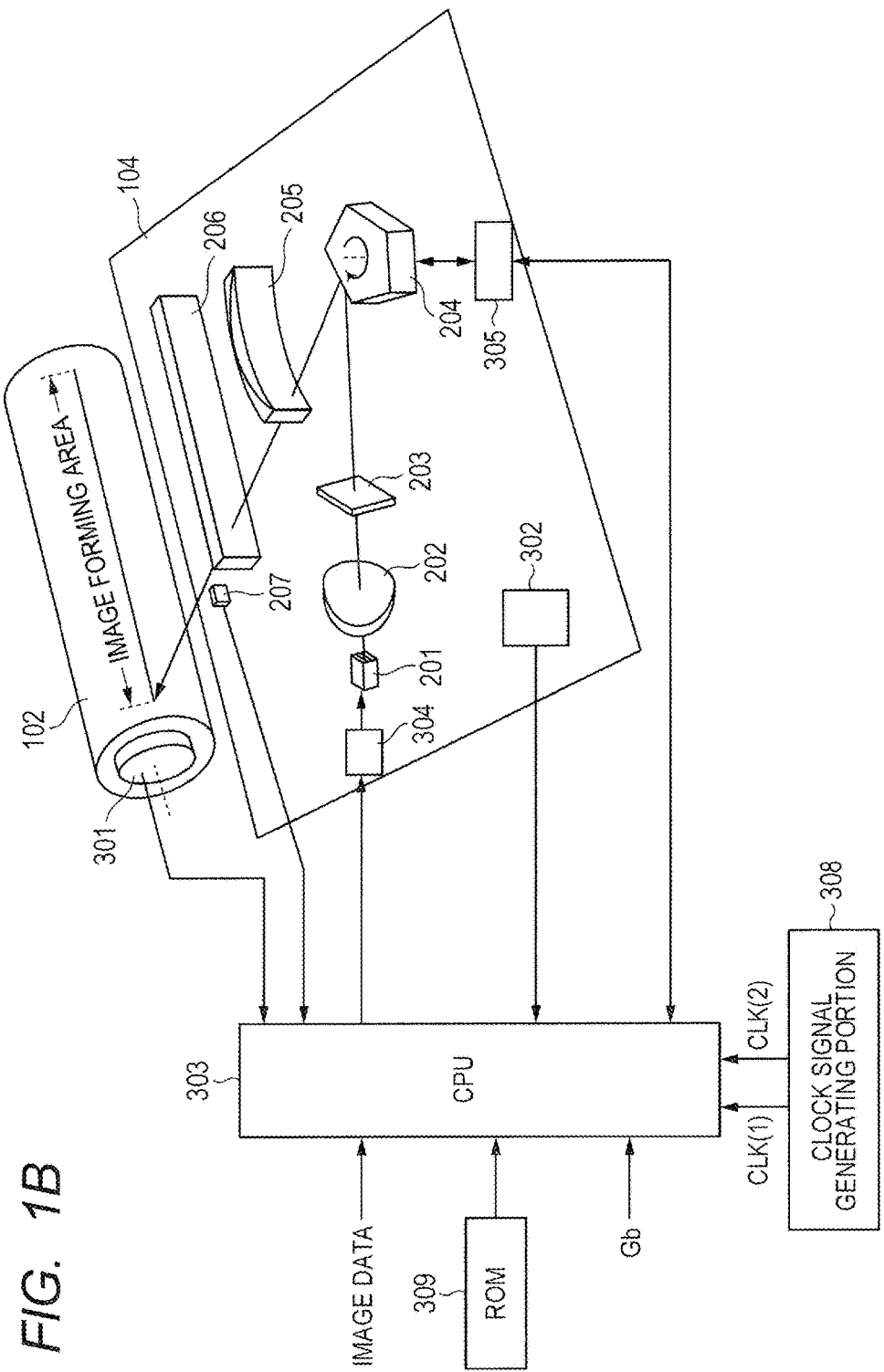
FIG. 1B is a view for illustrating a configuration of the periphery of a photosensitive drum and a light scanning device of the first embodiment.

FIG. 1B is an illustration of configurations of the photosensitive drum 102, the light scanning device 104, and a controller for the light scanning device 104. The light scanning device 104 includes a laser light source 201, a collimator lens 202, a cylindrical lens 203, and a rotary polygon mirror 204. The laser light source 201 includes a plurality of light emitting points. The plurality of light emitting points are each configured to emit a laser beam (light beam). The collimator lens 202 is configured to collimate the laser beam. The cylindrical lens 203 condenses the laser beam having passed through the collimator lens 202 in a sub-scanning direction. In the embodiment, the laser light source 201 will be described by exemplifying a light source in which a plurality of light emitting points are arranged, but is similarly operated also in the case of using a single light source. The laser light source 201 is driven by a laser drive circuit 304. The rotary polygon mirror 204 is formed of a motor portion configured to be operated to rotate and a reflection mirror mounted on a motor shaft. A face of the reflection mirror of the rotary polygon mirror 204 is hereinafter referred to as "mirror face". The rotary polygon mirror 204 is driven by a rotary polygon mirror drive portion (hereinafter referred to as "mirror drive portion") 305. The light scanning device 104 includes fθ lenses 205 and 206 configured to receive a laser beam (scanning light) deflected by the rotary polygon mirror 204. Further, the light scanning device 104 includes a memory 302 which is a storage unit configured to store various pieces of information.

Further, the light scanning device 104 includes a beam detector 207 (hereinafter referred to as "BD 207") which is a signal generating unit configured to detect the laser beam deflected by the rotary polygon mirror 204 and output a horizontal synchronization signal (hereinafter referred to as "BD signal") in accordance with the detection of the laser beam. The laser beam output from the light scanning device 104 scans the photosensitive drum 102. The direction of the laser beam is substantially parallel to the rotary shaft of the photosensitive drum 102. Every time the mirror face of the rotary polygon mirror 204 scans the photosensitive drum 102, the light scanning device 104 causes a laser beam emitted from the laser light source to move (scan) in the main scanning direction, to thereby form scanning lines corresponding to the number of laser elements (light emitting points) simultaneously. In the embodiment, a configuration is described in which the rotary polygon mirror 204 has five mirror faces, and the laser light source 201 includes eight laser elements, as an example. Specifically, in the embodiment, an image of eight lines is formed with one scanning. The rotary polygon mirror 204 scans the photosensitive drum 102 five times per one revolution or the rotary polygon mirror 204, to thereby form an image of forty lines in total.

The photosensitive drum 102 includes a rotary encoder 301 on the rotary shaft, and the rotation speed of the photosensitive drum 102 is detected with the use of the rotary encoder 301. The rotary encoder 301 is configured to generate 1,000 pulses per one revolution of the photosensitive drum 102. The rotary encoder 301 is configured to measure a time interval between the generated pulses using a built-in timer. The rotary encoder 301 is configured to output information (rotation speed data) on the rotation speed of the photosensitive drum 102 to a CPU 303 based on measurement results. A known speed detection technology other than the above-mentioned rotary encoder 301 may be used as long as the rotation speed of the photosensitive drum 102 can be detected. As a method other than the use of the rotary encoder 301, there is given, for example, a configuration to detect the surface speed of the photosensitive drum 102 with a laser Doppler.

<Block Diagram of CPU>

Next, the CPU 303 serving as a controller configured to control the light scanning device 104, and a clock signal generating portion 308 are described with reference to FIG. 2. The CPU 303 and the clock signal generating portion 308 are mounted on the image forming apparatus 100. FIG. 2 is a block diagram for illustrating the functions of the CPU 303 configured to execute correction processing of correcting distortion and uneven image density of an image described later as a correction unit, a transformation unit, and a filtering unit. The CPU 303 includes a filtering portion 501, an error diffusion processing portion 502, and a PWM signal generating portion 503. The filtering portion 501 is configured to perform filtering by subjecting input image data to a convolution operation. The error diffusion processing portion 502 is configured to subject the image data after the filtering to error diffusion processing. The PWM signal generating portion 503 is configured to subject the image data (density data) after the error diffusion processing to PWM transformation and output a PWM signal to the laser drive circuit 304 of the light scanning device 104. The clock signal generating portion 308 is configured to output a clock signal CLK(1) and a clock signal CLK(2) to the CPU 303. The clock signal CLK(1) is a clock signal illustrated in FIG. 5. The clock signal CLK(1) is a signal generated by multiplying the clock signal CLK(2). Thus, the clock signal CLK(1) and the clock signal CLK(2) have a synchronization relationship. In the embodiment, the clock signal generating portion 308 outputs the clock signal CLK(1) generated by multiplying the clock signal CLK(2) by 16 to the CPU 303. The clock signal CLK(2) is a signal having a period corresponding to one pixel. The clock signal CLK(1) is a signal having a period corresponding to divided pixels obtained by dividing one pixel by 16.

Further, the CPU 303 includes a filter coefficient setting portion 504, a filter function output portion 505, and a correction value setting portion 506. The filter function output portion 505 is configured to output data on a function to be used for a convolution operation (for example, data in a table) to the filter coefficient setting portion 504. As a function to be used for the convolution operation, there is given, for example, linear interpolation and bicubic interpolation. The correction value setting portion 506 is configured to calculate a positional deviation amount in the rotation direction of the photosensitive drum 102 of a scanning line formed with a laser beam deflected by a mirror face identified by a face identifying portion 507, based on information on a positional deviation amount of a light emitting point of the laser light source 201 and an amount of optical face tangle of the mirror face of the rotary polygon mirror 204, which are read from the memory 302 of the optical scanning device 104, and a face synchronization signal input from the face identifying portion 507. In a first embodiment described later, the correction value setting portion 506 is configured to correct an amount of optical face tangle of the mirror face of the rotary polygon mirror 204 with an amplitude gain Gb corresponding to an image selected from a test chart described later. Further, in a second embodiment described later, the correction value setting portion 506 is configured to calculate the amplitude gain Gb based on focus distance information $\Delta x$ stored in the memory 302 and correct an amount of optical face tangle of the mirror face of the rotary polygon mirror 204 with the calculated amplitude gain Gb. The correction value setting portion 506 is configured to calculate a correction value based on the positional deviation amount of the scanning line and output the calculated correction value to the filter coefficient setting portion 504. The filter coefficient setting portion 504 is configured to calculate a filter coefficient to be used for the filtering in the filtering portion 501 based on information on the convolution function input from the filter function output portion 505 and the correction value of the scanning line input from the correction value setting portion 506. The filter coefficient setting portion 504 is configured to set the calculated filter coefficient in the filtering portion 501. The correction value input to the filter coefficient setting portion 504 from the correction value setting portion 506 is a correction value set individually for each of the plurality of mirror faces.

Further, the CPU 303 includes the face identifying portion 507. The face identifying portion 507 is configured to identify a mirror face of the rotary polygon mirror 204 based on an HP signal input from a home position sensor (hereinafter referred to as "HP sensor") 307 of the light scanning device 104 and the BD signal input from the BD 207. The face identifying portion 507 is configured to output information of the identified mirror face to the correction value setting portion 506 as a face synchronization signal.

As illustrated in FIG. 1B, the CPU 303 is configured to receive image data from an image controller (not shown) configured to generate image data. The image data is tone data indicating a density value. The tone data is data of a plurality of bits indicating a density value for each pixel. For example, in the case of image data of 4 bits, a density value for one pixel is expressed by 16 tones, and in the case of image data of 8 bits, a density value for one pixel is expressed by 256 tones. In the embodiment, the image data input to the CPU 303 from the image controller is 4 bits per pixel. The filtering portion 501 is configured to subject the image data to filtering for each pixel in synchronization with the clock signal CLK(2). Further, in the first embodiment described later, the amplitude gain Gb described later is also input to the CPU 303. The CPU 303 is connected to the rotary encoder 301, the BD 207, the memory 302, the laser drive circuit 304, and a mirror drive portion 305. The CPU 303 is configured to detect a write position of a scanning line based on the BD signal input from the BD 207 and count a time interval of the BD signal, to thereby detect the rotation speed of the rotary polygon mirror 204. Further, the CPU 303 is configured to output an acceleration or deceleration signal for designating acceleration or deceleration to the mirror drive portion 305 so that the rotary polygon mirror 204 reaches a predetermined speed. The mirror drive portion 305 is configured to supply a driving current to the motor portion of the rotary polygon mirror 204 in accordance with the acceleration or deceleration signal input from the CPU 303, to thereby drive a motor 306.

As illustrated in FIG. 2, the HP sensor 307 is mounted on the rotary polygon mirror 204 and is configured to output the HP signal to the CPU 303 at timing at which the rotary polygon mirror 204 reaches a predetermined angle during a rotation operation. For example, the HP signal is generated once during every rotation of the rotary polygon mirror 204. The face identifying portion 507 resets an internal counter in response to the generation of the HP signal. Then, the face identifying portion 507 increments a count value of the internal counter by "1" every time the BD signal is input. That is, each count value of the internal counter is information indicating a corresponding one of the plurality of mirror faces of the rotary polygon mirror 204. The CPU 303 can identify which of the plurality of mirror faces the input image data corresponds to with the use of the count value. That is, the CPU 303 can switch a filter coefficient for correcting the input image data with the use of the count value.

The memory 302 is configured to store, for each mirror face, position information (first scanning position information) indicating positional deviation amounts from ideal scanning positions in the sub-scanning direction of a plurality of laser beams reflected by the mirror faces of the rotary polygon mirror 204. Further, the memory 302 is configured to store position information (second scanning position information) indicating a positional deviation amount from the ideal scanning position in the sub-scanning direction of the laser beam emitted from each light emitting point. The CPU 303 is configured to read from the memory 302 positional deviation information in the sub-scanning direction caused by an optical face tangle error for each mirror face of the rotary polygon mirror 204 and positional deviation information of a multibeam laser of 1,200 dpi with respect to the ideal position in the sub-scanning direction. The CPU 303 is configured to calculate position information of each scanning line based on the positional deviation information read from the memory 302.

The correction value setting portion 506 is configured to calculate a correction value based on the position information of each scanning line input from the memory 302 and output the calculated correction value to the filter coefficient setting portion 504. The filter coefficient setting portion 504 is configured to calculate a filter coefficient with the use of the correction value input from the correction value setting portion 506 and a filter function input from the filter function output portion 505. The filtering portion 501 is configured to receive image data from the image controller (not shown) configured to generate image data. The filtering portion 501 is configured to subject the image data to the filtering based on the filter coefficient input from the filter coefficient setting portion 504, to thereby calculate image data taking information for correcting the position of each scanning line into account. The PWM signal generating portion 503 of the CPU 303 is configured to convert the image data taking the information for correcting the position of each scanning line into account into drive data. A ROM 309 is configured to store a conversion table for converting image data of 4 bits into drive data of 16 bits as shown in FIG. 18. The vertical axis of the conversion table shown in FIG. 18 represents image data indicating density values of 4 bits, which corresponds to one pixel. The horizontal axis of the conversion table shown in FIG. 18 represents drive data of 16 bits associated with the density values of 4 bits individually. For example, in the case where image data input to the PWM signal generating portion 503 is a bit pattern of "0110", the PWM signal generating portion 503 converts the image data "0110" into drive data which is a bit pattern of "0000000001111111" with the use of the conversion table. The PWM signal generating portion 503 outputs the converted drive data in the order of "0000000001111111" serially on a bit basis in accordance with the clock signal CLK(1) described later. When the PWM signal generating portion 503 outputs the drive data, a PWM signal is generated. When the PWM signal generating portion 503 outputs "1", a light emitting point emits a laser beam. When the PWM signal generating portion 503 outputs "0", a light emitting point does not output a laser beam.

<Scanning Position Information>

Figure 3:
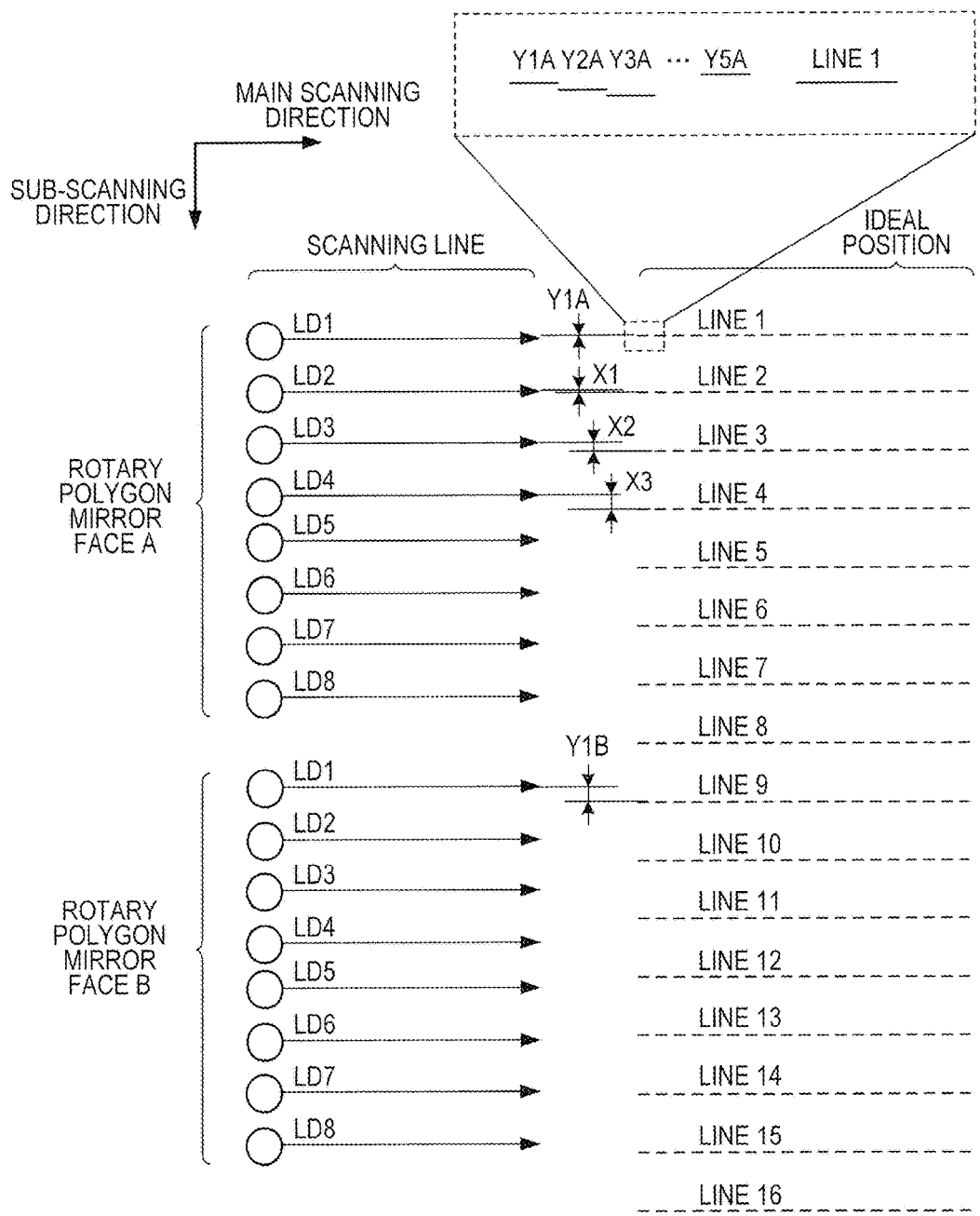
FIG. 3 is a diagram for illustrating positional deviation of scanning lines of the first and second embodiments.

Next, scanning position information stored in the memory 302 will be described with reference to FIG. 3 and Table 1. FIG. 3 is an illustration of a state of positional deviation of each scanning line from an ideal position. Scanning lines scanned by each laser beam of the laser light source having eight light emitting points are denoted by LD1, LD2, LD3, LD4, LD5, LD6, LD7, and LD8. An ideal interval (predetermined interval) between the respective scanning lines is determined based on a resolution. For example, in the case of an image forming apparatus having a resolution of 1,200 dpi, an ideal interval between the respective scanning lines is 21.16 μm. When the scanning line LD1 is defined as a reference position, ideal distances D2 to D8 of the scanning lines LD2 to LD8 from the scanning line LD1 are calculated by Expression (1).

$$Dn=(n-1)\times 21.16 \text{ μm}(n=2 \text{ to } 8) \quad \text{Expression (1)}$$

For example, the ideal distance D4 from the scanning line LD1 to the scanning line LD4 is 63.48 μm (=(4−1)×21.16 μm).

In this case, an interval between the scanning lines on the photosensitive drum 102 has an error due to an error of arrangement intervals of the plurality of light emitting points and characteristics of a lens. The positional deviation amounts of the scanning lines LD2 to LD8 with respect to ideal positions determined based on the ideal distances D2 to D8 are denoted by X1 to X7. Regarding a face A of the rotary polygon mirror 204, for example, the positional deviation amount X1 of the scanning line LD2 is defined as a difference between the ideal position of the scanning line LD2 (hereinafter referred to as "LINE 2", which similarly applies to the other scanning lines) and the actual scanning line. Further, for example, the positional deviation amount X3 of the scanning line LD4 is defined as a difference between the LINE 4 and the actual scanning line.

Due to a variation in manufacturing of each mirror face of the rotary polygon mirror 204, the mirror faces of the rotary polygon mirror 204 are not completely parallel to the rotary shaft, and the rotary polygon mirror 204 has an angle variation for each mirror face. Further, in scanning of a laser beam on each mirror face, a deviation amount varies depending on the position in the main scanning direction. In the embodiment, an image area in the main scanning direction is divided into a predetermined number of blocks, for example, five blocks and an amount of optical face tangle corresponding to each of the five blocks is stored in the memory 302 for each mirror face. When position information is stored in the memory 302 for each block as described above, a capacity can be reduced as compared to the case where position information is held for each pixel.

When the number of mirror faces of the rotary polygon mirror 204 is five, and the number of blocks in the main scanning direction is five, amounts of optical face tangle with respect to ideal positions in the respective mirror faces of the rotary polygon mirror 204 are represented by Y1A to Y5E. In this case, A to E represent five faces of the rotary polygon mirror 204, and 1 to 5 represent five blocks in the main scanning direction. For example, amounts of optical face tangle from the ideal positions of the first to fifth blocks in the scanning line (LINE 1) LD1 of the face A of the rotary polygon mirror 204 are represented by Y1A, Y2A, Y3A, Y4A, and Y5A. Similarly, deviation amounts from the ideal positions of the first to fifth blocks in the scanning line (LINE 9) LD1 of a face B of the rotary polygon mirror 204 are represented by Y1B, Y2B, Y3B, Y4B, and Y5B.

In the embodiment, a positional deviation amount is calculated based on the amounts of optical face tangle Y1A to Y5E described above and an amount obtained by integrating the amplitude gain Gb. The embodiment has a configuration in which the amplitude gain Gb can be input to the amounts of optical face tangle (Y1A to Y5E) measured in the single optical scanning device 104 from the image forming apparatus 100 side, and a correction amount for correcting banding is adjusted. Further, the amplitude gain Gb is a value determined based on a positional deviation amount (which is the above-mentioned ±Δd and is also an amount of optical face tangle) from the ideal optical path B of the optical path A of the light scanning device 104 illustrated in FIG. 17A. A method of determining the amplitude gain Gb will be described in the embodiments later.

A total positional deviation amount of an amount of optical face tangle of an m-th mirror face of the rotary polygon mirror 204 and a positional deviation amount of the b-th block in the main scanning direction of an n-th laser beam of the laser light source (hereinafter simply referred to as "positional deviation amount") is represented by Znbm. Then, the positional deviation amount Znbm is represented by Expression (2) with the use of the positional deviation amounts X1 to X7 in the sub-scanning direction of the respective scanning lines, the amounts of optical face tangle YA to YE of the respective mirror faces, and the amplitude gain Gb.

$$Znbm = YbmxGb + X(n-1) \quad \text{Expression (2)}$$

(n=1 to 8, b=1 to 5, m=A to E)
(where X(0)=0)

For example, a positional deviation amount Z43A of the third block in the scanning line LD4 of the face A of the rotary polygon mirror 204 is determined to be Z43A=Y3A×G3+X3 by Expression (2). Further, a positional deviation amount Z15B of the fifth block in the scanning line LD1 of the face B of the rotary polygon mirror 204 is determined to be Z15B=Y5B×G5 by Expression (2). The first term "YbmxGb" of the right side of Expression (2) is an amount of optical face tangle obtained by correcting the amount of optical face tangle of the mirror face of the rotary polygon mirror 204 with the use of the amplitude gain Gb.

When the positional deviation amount Znbm is calculated by Expression (2), it is only necessary that the number of pieces of data to be used for calculating the positional deviation amount Znbm correspond to the number of the mirror faces of the rotary polygon mirror 204, the number of light emitting points of the laser light source, and the number of blocks in the main scanning direction. An address map of positional deviation data stored in the memory 302 is shown in Table 1.

TABLE 1

| Address | Data |
|---|---|
| 1 | LD2 position information X1 |
| 2 | LD3 position information X2 |
| 3 | LD4 position information X3 |
| 4 | LD5 position information X4 |
| 5 | LD6 position information X5 |
| 6 | LD7 position information X6 |
| 7 | LD8 position information X7 |
| 8 | Face A position information Y1A |
| 9 | Face A position information Y2A |
| 10 | Face A position information Y3A |
| 11 | Face A position information Y4A |
| 12 | Face A position information Y5A |
| 13 | Face B position information Y1B |
| 14 | Face B position information Y2B |
| 15 | Face B position information Y3B |
| 16 | Face B position information Y4B |
| 17 | Face B position information Y5B |
| 18 | Face C position information Y1C |
| 19 | Face C position information Y2C |
| 20 | Face C position information Y3C |
| 21 | Face C position information Y4C |
| 22 | Face C position information Y5C |
| 23 | Face D position information Y1D |
| 24 | Face D position information Y2D |
| 25 | Face D position information Y3D |
| 26 | Face D position information Y4D |
| 27 | Face D position information Y5D |
| 28 | Face E position information Y1E |
| 29 | Face E position information Y2E |
| 30 | Face E position information Y3E |
| 31 | Face E position information Y4E |
| 32 | Face E position information Y5E |

As shown in Table 1, in the addresses 1 to 7 of the memory 302, information on the respective positional deviation amounts (described as position information) X1 to X7 of the scanning line LD2 to the scanning line LD8 is stored. Further, in the addresses 8 to 12 of the memory 302, information on the respective positional deviation amounts Y1A to Y5A of the blocks 1 to 5 of the mirror face A of the rotary polygon mirror 204 is stored. Further, in the addresses 13 to 17 of the memory 302, information on the respective positional deviation amounts Y1B to Y5B of the blocks 1 to 5 of the mirror face B of the rotary polygon mirror 204 is stored. Further, in the addresses 18 to 22 of the memory 302, information on the respective positional deviation amounts Y1C to Y5C of the blocks 1 to 5 of the mirror face C of the rotary polygon mirror 204 is stored. Further, in the addresses 23 to 27 of the memory 302, information on the respective positional amounts Y1D to Y5D of the blocks 1 to 5 of the mirror face D of the rotary polygon mirror 204 is stored. Further, in the addresses 28 to 32 of the memory 302, information on the positional deviation amounts Y1E to Y5E of the blocks 1 to 5 of the mirror face E of the rotary polygon mirror 204 is stored.

(Memory Storage Operation)

As information on a positional deviation amount to be stored in the memory 302, for example, data measured in an adjustment step of the light scanning device 104 in a factory or the like is stored. Further, the image forming apparatus 100 may include a position detection unit configured to detect the position of a scanning line formed with a laser beam emitted from the laser light source 201 so that the information stored in the memory 302 may be updated in real time. As the position detection unit configured to detect a position of scanning light in the sub-scanning direction, a known technology may be used. For example, a position may be detected by a CMOS sensor or a position sensitive detector (PSD) arranged in the light scanning device 104 or arranged on a scanning path of a laser beam near the photosensitive drum 102. Further, a triangular slit may be formed in a surface of a photo diode (PD) arranged in the light scanning device 104 or arranged near the photosensitive drum 102, to thereby detect a position from an output pulse width of the PD.

Figure 4:
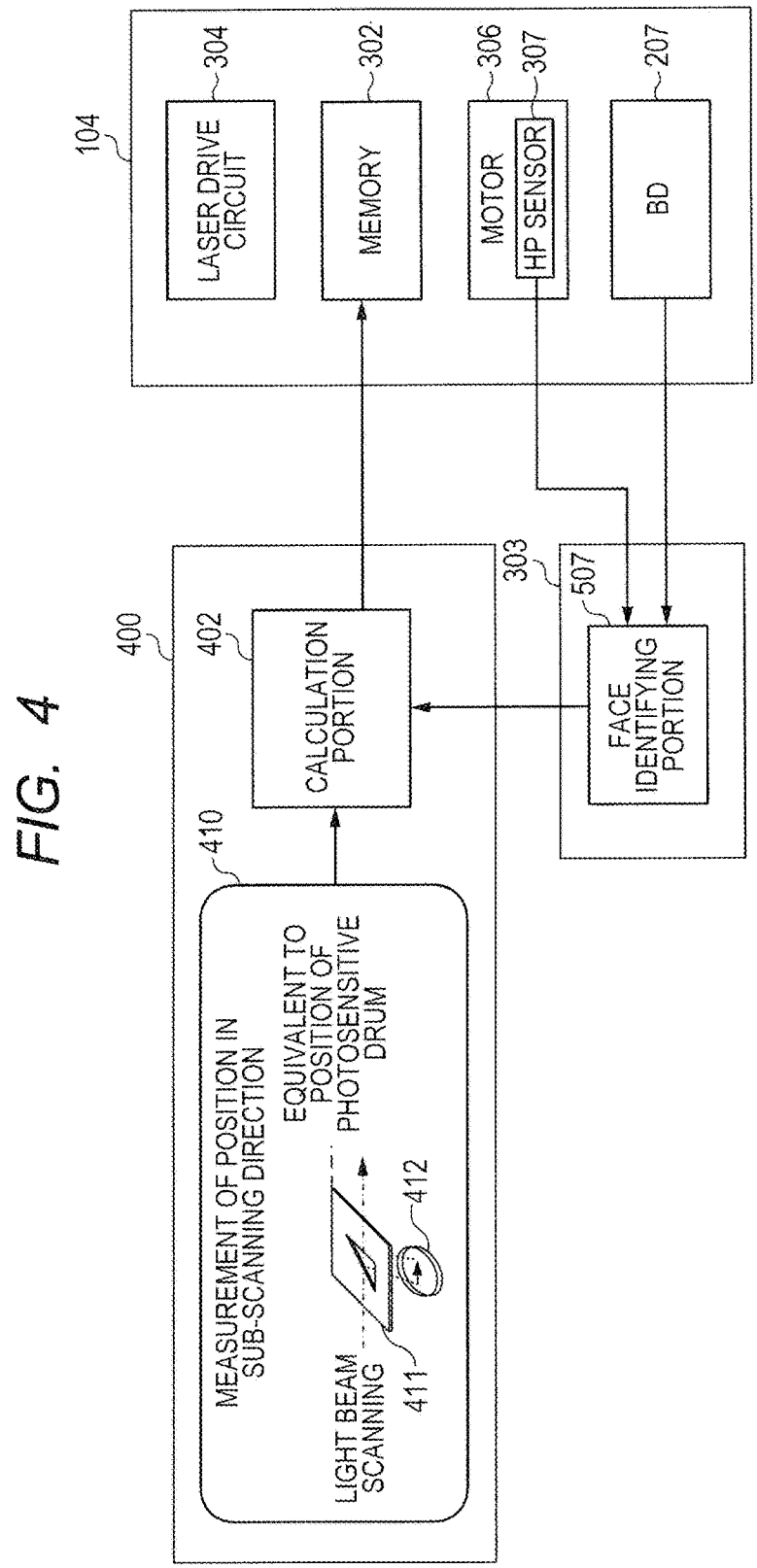
FIG. 4 is a block diagram for illustrating a step of storing information in a memory of the first and second embodiments.

FIG. 4 is a block diagram for illustrating a step of storing information in the memory 302 of the light scanning device 104 in a factory or the like as an example. The same configurations as those of FIG. 2 are denoted by the same reference symbols as those therein, and the description thereof is omitted. In the adjustment step for the light scanning device 104, a measuring instrument 400 is arranged at a position corresponding to the scanning position on the photosensitive drum 102 when the light scanning device 104 is mounted on the image forming apparatus 100. The measuring instrument 400 includes a measuring portion 410 and a calculation portion 402, and the calculation portion 402 is configured to receive a face synchronization signal from the face identifying portion 507 of the CPU 303 of FIG. 2. In the CPU 303 of FIG. 4, only the face identifying portion 507 is illustrated. First, a laser beam is radiated on the measuring portion 410 from the light scanning device 104. The measuring portion 410 includes a triangular slit 411 and a PD 412. A laser beam emitted from the light scanning device 104 indicated by the arrow with the alternate long and short dash line in FIG. 4 scans the triangular slit 411. The measuring portion 410 measures the position in the sub-scanning direction of a scanning line based on information on the laser beam input to the PD 412 through the triangular slit 411. The measuring portion 410 outputs information on the measured position in the sub-scanning direction, which depends on the main-scanning direction, of the scanning line in each mirror face (hereinafter referred to as "data for each face") of the rotary polygon mirror 204 to the calculation portion 402.

Meanwhile, the face identifying portion 507 is configured to receive the HP signal from the HP sensor 307 of the light scanning device 104 and receive the BD signal from the BD 207. With this, the face identifying portion 507 is configured to identify a mirror face of the rotary polygon mirror 204 and output information on the identified mirror face to the calculation portion 402 as a face synchronization signal. The calculation portion 402 is configured to write the information on the position in the sub-scanning direction, which depends on the main-scanning direction, of the scanning line measured by the measuring portion 410 into an address on the memory 302 of the light scanning device 104 in accordance with the information on the mirror face of the rotary polygon mirror 204 input from the face identifying portion 507. Thus, the information on the positional deviation amounts of the scanning lines caused by a variation in intervals between the eight light emitting points of the laser light source 201 (X1 to X7) is stored in the memory 302. Further, the information on the positional deviation amounts of the scanning lines caused by an optical face tangle error of the mirror face of the rotary polygon mirror 204 (Y1 to Y5) for each block is also stored in the memory 302.

<Method of Calculating Positional Deviation Amount>

Figure 5:
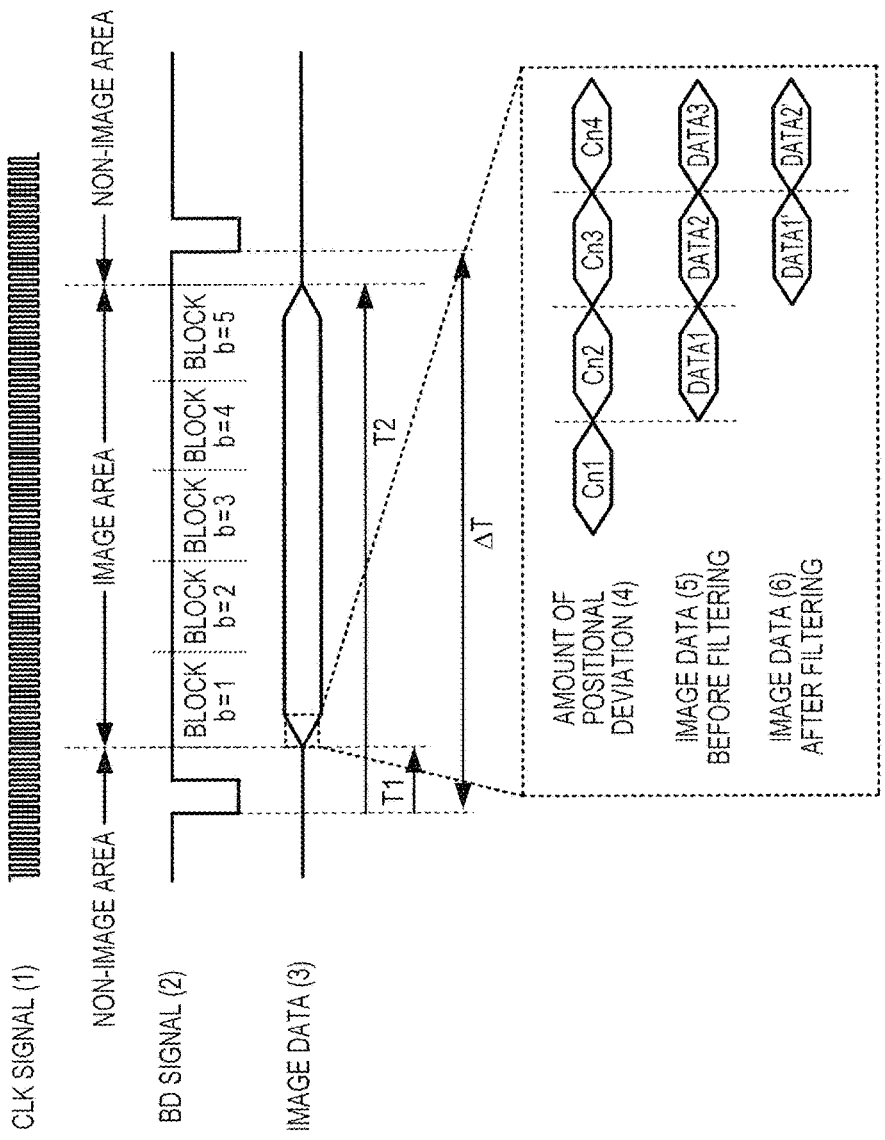
FIG. 5 is a time chart for illustrating one scanning period of the first and second embodiments.

FIG. 5 is a diagram for illustrating control timing in one scanning period of the n-th laser beam in the sub-scanning direction of the embodiment. (1) represents a CLK signal corresponding to a pixel period per pixel (1/16 pixel) obtained by dividing one pixel by 16. (2) represents input timing of a BD signal from the BD 207 with respect to the CPU 303. (3) and (5) represent input timing of image data DATAN (N=1, 2, . . . ) before filtering with respect to the CPU 303. (4) represents timing at which a positional deviation amount CnN (N=1, 2, . . . ) corresponding to each pixel is calculated. (6) represents timing at which image data DATAN' (N=1, 2, . . . ) subjected to the filtering is output to the laser drive circuit 304. N at the end of DATAN and DATAN' represents a number of a pixel in one scanning line in the main scanning direction.

When the BD signal output from the BD 207 is defined as a reference, a time is represented by T1, which is from the input of the BD signal to the CPU 303 to the start of the processing of image data input to the CPU 303 during a period from the input of the BD signal to the CPU 303 to the input of a subsequent BD signal. Further, a time is represented by T2, which is from the input of the BD signal to the CPU 303 to the completion of the output of the image data input to the CPU 303 during a period from the input of the BD signal to the CPU 303 to the input of a subsequent BD signal. The CPU 303 stands by until the predetermined time T1 elapses after the input of the BD signal, and starts filtering of the input image data in synchronization with the clock signal CLK (2) to generate drive data successively from the processed image data. Then, the CPU 303 outputs the drive data by one bit to output a PWM signal to the laser drive circuit 304. Then, the CPU 303 ends the processing of the image data in one scanning line after the predetermined time T2 elapses after the input of the BD signal. The CPU 303 calculates a positional deviation amount of a scanning line in the scanning period during a period in which the predetermined time T1 elapses from the detection of the BD signal, that is, a period in which a laser beam scans a non-image area. Then, the CPU 303 causes the filter coefficient setting portion 504 to set a filter coefficient based on the calculated positional deviation amount. The CPU 303 causes the filtering portion 501 to correct the image data with the use of the filter coefficient set by the filter coefficient setting portion 504 for each scanning until the predetermined time T2 elapses after the predetermined time T1 elapses. That is, the CPU 303 calculates a positional deviation amount of a scanning line in the image area and sends the image data after the filtering by the filtering portion 501 to the laser drive circuit 304, to thereby form an image. In this case, a positional deviation amount with respect to a pixel of interest is calculated during a time of one period of the CLK signal of (1). Further, the filtering with respect to the pixel of interest is performed by the filtering portion 501 during a time of one period of the CLK signal of (1). Then, after one clock from the input of the image data before filtering, the image data after filtering is output to the laser drive circuit 304 (broken frame part of FIG. 5). A time interval of the BD signal output from the BD 207 is represented by ΔT, which corresponds to a time per scanning.

In the embodiment, the positional deviation amount (CnN) of each pixel represented by (4) of FIG. 5 is calculated with the use of the positional deviation amounts of the five blocks (b=1 to 5) divided in the main scanning direction. The positional deviation amount of each pixel may be obtained by subjecting the positional deviation amounts of the respective blocks to linear interpolation and sorting the resultant positional deviation amounts to positional deviation amounts of the respective pixels. One positional deviation amount may correspond to one pixel in the main scanning direction, or one positional deviation amount may correspond to a plurality of pixels. Through the above-mentioned operation, between the time T1 and the time T2, the CPU 303 calculates a positional deviation amount, performs filtering, and sends the image data to the laser drive circuit 304, to thereby form an image for one scanning.

(Calculation of Positional Deviation Amount of N-th Pixel)

Figure 6:
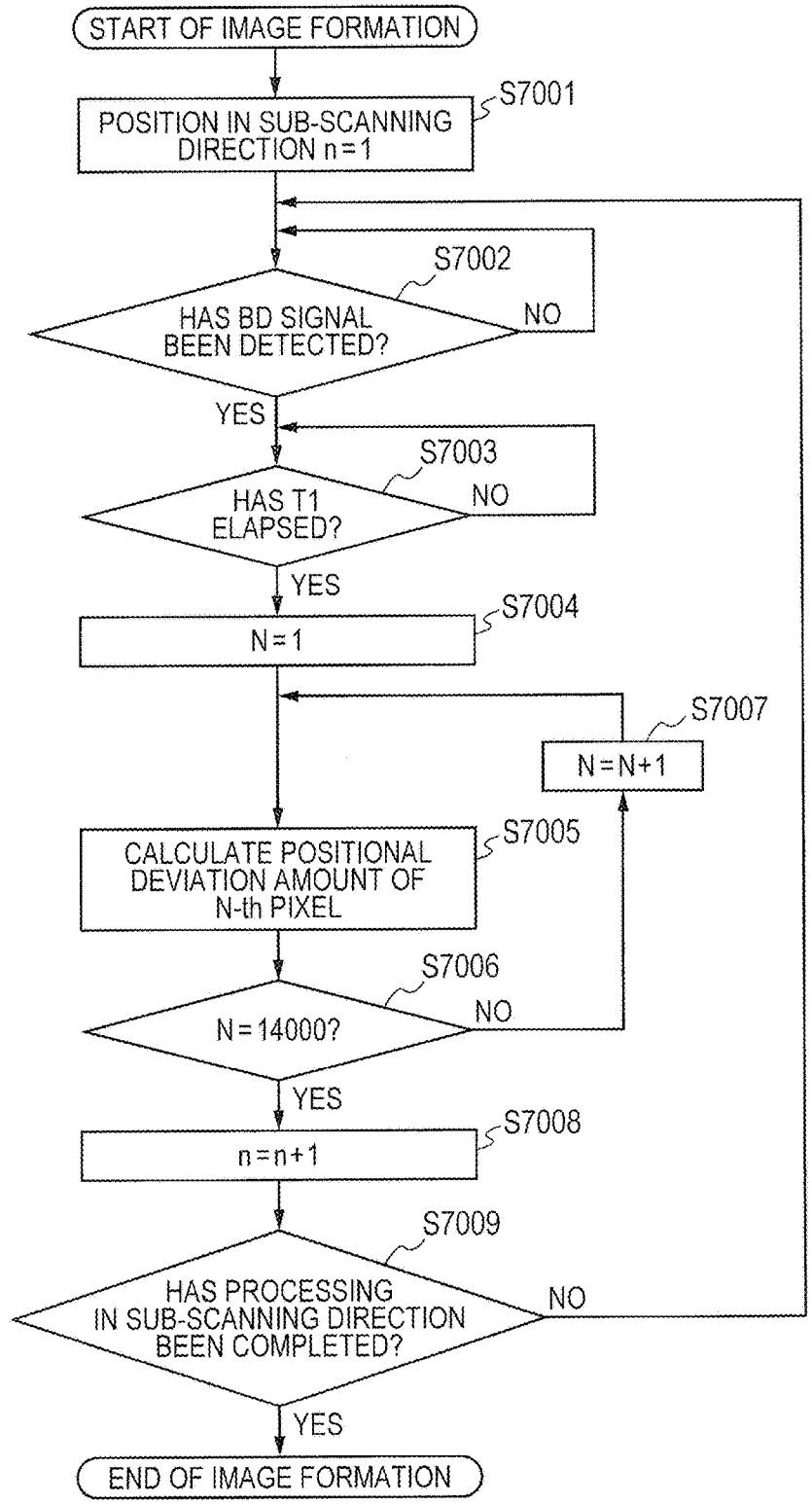
FIG. 6 is a flowchart for illustrating image forming processing of the first and second embodiments.

FIG. 6 is a flowchart for illustrating processing of forming an image while calculating a positional deviation amount of an N-th pixel in the main scanning direction, which is performed by the CPU 303. The CPU 303 calculates a positional deviation amount for each scanning line during image formation, to thereby form an image. In Step (hereinafter abbreviated as "S") 7001, that is, in S7001, the CPU 303 sets a position n in the sub-scanning direction to 1. The CPU 303 determines in S7002 whether or not the BD signal has been input from the BD 207. When the CPU 303 determines in S7002 that the BD signal has been input, the CPU 303 stops a timer (not shown) configured to measure a time interval corresponding to a period of the BD signal and reads and stores a timer value in an internal register. Then, the CPU 303 resets and starts the timer (not shown) in order to measure a time interval until a subsequent BD signal is received and proceeds to the processing of S7003. When the CPU 303 includes two or more timers (not shown), the CPU 303 may alternately use the different timers every time the BD signal is received, to thereby measure a time interval. Although the measured time interval of the BD signal is stored in the internal register of the CPU 303, the CPU 303 may store the time interval in, for example, a RAM (not shown). When the CPU 303 determines in S7002 that the BD signal has not been input, the CPU 303 returns to the processing of S7002 in order to wait for input of the BD signal.

In S7003, the CPU 303 refers to the timer, to thereby determine whether or not the time T1 has elapsed from the detection of the BD signal. When the CPU 303 determines in S7003 that the time T1 has elapsed, the CPU 303 determines that the laser beam has entered the image area in the main scanning direction and proceeds to the processing of S7004. When the CPU 303 determines in S7003 that the time T1 has not elapsed, the CPU 303 determines that the laser beam is still in the non-image area in the main scanning direction and returns to the processing of S7003. In S7004, the CPU 303 sets a variable N to 1. In this case, the variable N is a variable corresponding to a pixel number from an image write leading pixel in the main scanning direction. In S7005, the CPU 303 calculates a positional deviation amount (CnN) of the N-th pixel in the main scanning direction ((4) of FIG. 5) and subjects the image data to filtering based on the positional deviation amount ((5) and (6) of FIG. 5). The CPU 303 determines in S7006 whether or not N is 14,000. When the CPU 303 determines that N is 14,000, the CPU 303 proceeds to the processing of S7008. When the CPU 303 determines in S7006 that N is not 14,000, the CPU 303 proceeds to the processing of S7007. In S7007, the CPU 303 adds 1 to N (N=N+1), and returns to the processing of S7005 in order to subject a subsequent pixel in the main scanning direction to calculation. In this case, for example, when an image is formed with a resolution of 1,200 dpi on a recording sheet of an A4 size (length in the main scanning direction is 297 mm), the number of pixels is about 14,000. Therefore, when a positional deviation amount of each pixel is calculated by changing the pixel number N within a range of from 1 to 14,000 in the main scanning direction, a positional deviation amount of one scanning is calculated. When the resolution is changed, the threshold value of S7006 is also changed to a value in accordance with the resolution.

In S7008, the CPU 303 adds 1 to the position n in the sub-scanning direction (n=n+1) and proceeds to the processing of S7009. The CPU 303 determines in S7009 whether or not the processing of one page has been completed based on the position n in the sub-scanning direction. When the CPU 303 determines that the processing has been completed, the CPU 303 ends the processing. When the CPU 303 determines that the processing has not been completed, the CPU 303 returns to the processing of S7002.

(Calculation of Positional Deviation Amount)

A calculation expression of the positional deviation amount CnN calculated by the CPU 303 in S7005 will be described in detail. The positional deviation amount CnN of an n-th scanning line with respect to the pixel number N in the main scanning direction is determined as follows. That is, the positional deviation amount CnN is determined by adding a positional deviation amount A caused by a change in rotation speed of the photosensitive drum 102 and the rotary polygon mirror 204 to a positional deviation amount B that depends on the main scanning direction for each scanning line, to thereby calculate a total positional deviation amount. When the rotation speed of the photosensitive drum 102 is represented by Vd, the rotation speed of the rotary polygon mirror 204 is represented by Vp, and one scanning time is represented by ΔT (see FIG. 5), the positional deviation amount A caused by a speed difference between the rotation speed Vd of the photosensitive drum 102 and the rotation speed Vp of the rotary polygon mirror 204 is calculated by the following Expression (3).

$$A = (Vd - Vp) \times \Delta T \qquad \text{Expression (3)}$$

In this case, ΔT represents a time corresponding to an interval of output timing of the BD signal, and the positional deviation amount A represents a positional deviation amount of a scanning line that moves during one scanning period due to a difference between the rotation speed Vd of the photosensitive drum 102 and the rotation speed Vp of the rotary polygon mirror 204. In this case, as described above, the rotation speed Vp of the rotary polygon mirror 204 is determined based on a printing speed Vpr. The printing speed Vpr is determined by Expressions (4) and (5) based on the relationship between the one scanning time ΔT and the multi-beam number (eight beams in the embodiment).

$$Vp = \text{Number of beams} \times 21.16/\Delta T \qquad \text{Expression (4)}$$

$$\Delta T = 1/(\text{Number of mirror faces of rotary polygon mirror 204} \times \text{Revolution number per second of rotary polygon mirror 204}) \qquad \text{Expression (5)}$$

Meanwhile, as the positional deviation amount B, a value calculated by Expression (2) is used.

$$B = Znbm \qquad \text{Expression (6)}$$

The CPU 303 adds the positional deviation amount A calculated by Expression (3) to the positional deviation amount B calculated by Expression (6), to thereby calculate a total positional deviation amount (total value=A+B). The CPU 303 holds the total positional deviation amount calculated in S7005 in the internal register of the CPU 303. In this case, the total positional deviation amount (=A+B) held in the internal register is read and used for calculation during filtering described later.

In the embodiment, the CPU 303 subjects image data on a plurality of scanning lines to calculation with the use of a filter set based on the positional deviation amount calculated for each scanning line. Therefore, in the above-mentioned positional deviation amount calculation operation, the CPU 303 determines positional deviation amounts of the plurality of scanning lines to be used for filtering, during a period from the output of the BD signal from the BD 207 to the elapse of the time T1. When the range of filtering is, for example, L=3, the CPU 303 refers to the image data on three pixels above and below a line of interest and calculates a positional deviation amount of each scanning line within the range of the three pixels above and below the line of interest, to thereby perform filtering.

In this case, a positional deviation amount of a scanning line corresponding to the line of interest is calculated during a period immediately before image formation. Further, calculation results of a positional deviation amount calculated for a scanning line formed previously is used for a scanning line formed before the line of interest. Regarding a scanning line to be formed at timing after the line of interest, the positional deviation amount B is determined based on the information on the mirror face of the rotary polygon mirror 204 corresponding to a scanning line to be formed later and the position information on a plurality of light emitting points. Further, the rotation speed Vp of the rotary polygon mirror 204 and the rotation speed Vd of the photosensitive drum 102 are determined as follows. That is, the rotation speeds Vp and Vd in a scanning line to be scanned next are respectively predicted to be determined based on a value detected at timing of previous scanning by the laser beam and a value detected at timing of scanning of the line of interest (current scanning line).

(Correction of Position of Pixel of Input Image in Sub-Scanning Direction)

Figure 7:
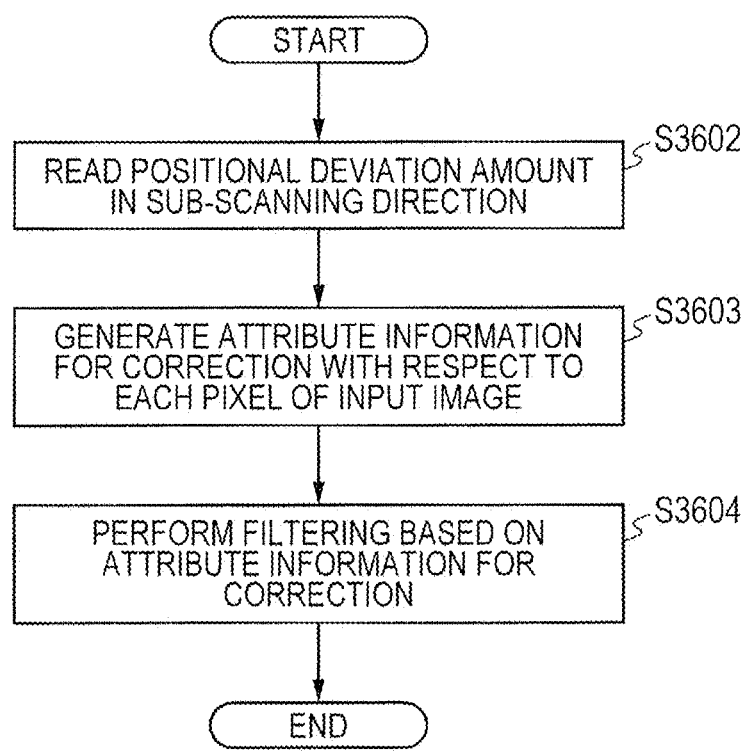
FIG. 7 is a flowchart for illustrating correction processing of the first and second embodiments.

In the embodiment, the CPU 303 is configured to correct image data based on the positional deviation amounts in the sub-scanning direction of the scanning lines formed by laser beams and output the corrected image data to the laser drive circuit 304. Now, a flowchart of FIG. 7 will be described below. FIG. 7 is a flowchart for illustrating correction processing for correcting uneven image density and banding caused by the positional deviation in the sub-scanning direction. In S3602, the CPU 303 reads the positional deviation amount in the sub-scanning direction and the amount of optical face tangle stored in the memory 302. Specifically, the CPU 303 reads the position information X1 to X7 of the scanning lines LD2 to LD8 and the position information Y1A to Y5E corresponding to the respective blocks of the faces A to E of the rotary polygon mirror 204 shown in Table 1 from the memory 302. In the case of the second embodiment described later, the CPU 303 also reads focus distance information Δx1 to Δx5 from the memory 302. In the embodiment, a pixel position of input image data in the sub-scanning direction is corrected based on the positional deviation amount in the sub-scanning direction, followed by filtering, to thereby output image data, that is, density.

(State of Positional Deviation of Scanning Line)

The state of positional deviation of a scanning line can be roughly classified into four cases. First, regarding the state of positional deviation, there is a case (a) in which the position of a scanning line (hereinafter referred to as "scanning position") on the photosensitive drum 102 is shifted in an advance direction with respect to an ideal scanning position, and a case (b) in which the scanning position on the photosensitive drum 102 is shifted in a return direction with respect to the ideal scanning position. Further, regarding the state of positional deviation, there is a case (c) in which the intervals between the scanning positions on the photosensitive drum 102 are dense with respect to the intervals between the ideal scanning positions, and a case (d) in which the intervals between the scanning positions on the photosensitive drum 102 are sparse with respect to the intervals between the ideal scanning positions. Specific examples of the state of positional deviation in the sub-scanning direction are illustrated in FIG. 8A, FIG. 8B, FIG. 8C, and FIG. 8D. In FIG. 8A to FIG. 8D, the broken lines represent scanning positions, and in FIG. 8A to FIG. 8D, (1) to (5) represent the order of scanning. In the embodiment, eight beams are used for scanning simultaneously, but description is given on the assumption that the order is allocated to each beam arranged successively in the sub-scanning direction. Each column on the left side of FIG. 8A to FIG. 8D represents ideal scanning positions, and each column on the right side represents scanning positions on the photosensitive drum 102. S1 to S5 represent positional deviation amounts from the ideal scanning positions with respect to scanning numbers (1) to (5). The unit of a positional deviation amount is represented based on the case where the ideal beam interval (21.16 μm at 1,200 dpi) is defined as 1, and the advance direction of a laser beam in the sub-scanning direction (hereinafter simply referred to as "advance direction") is set to a positive value. Further, the return direction of the laser beam in the sub-scanning direction (hereinafter simply referred to as "return direction") is set to a negative value. Further, in order to describe the state of an image, each pixel arranged in the sub-scanning direction is represented by a circle on the scanning line. The shading of the circle represents density.

Figure 8A:
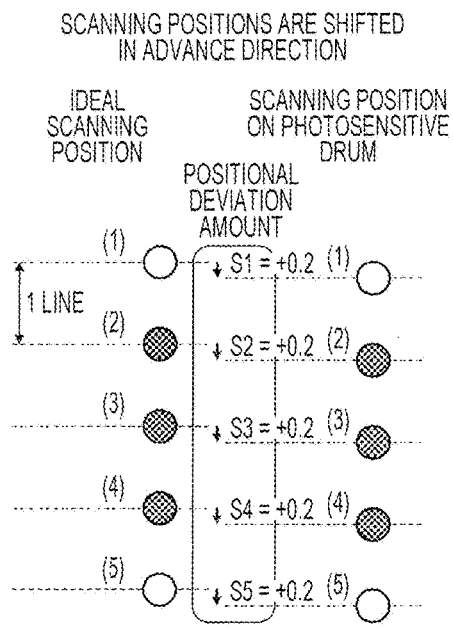
FIG. 8A, FIG. 8B, FIG. 8C, and FIG. 8D are each a diagram for illustrating positional deviation of pixels for each classification of the first and second embodiments.
Figure 8B:
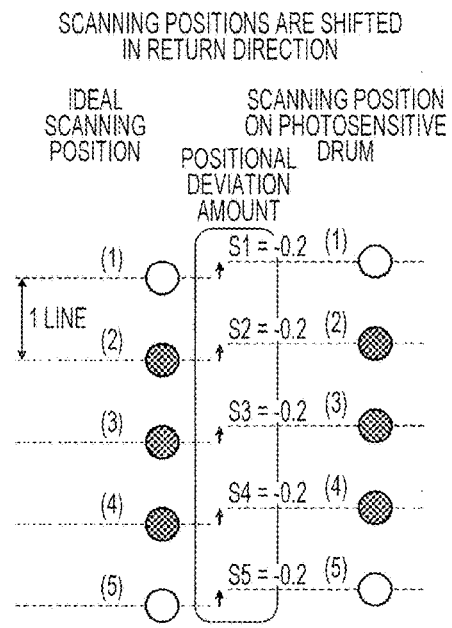

FIG. 8A is an illustration of an example in which the scanning positions on the photosensitive drum 102 are shifted by 0.2 uniformly in the advance direction from the ideal scanning positions. The positional deviation amount as illustrated in FIG. 8A is hereinafter referred to as a shift amount of +0.2. FIG. 8B is an illustration of an example in which the scanning positions on the photosensitive drum 102 are shifted by 0.2 uniformly in the return direction from the ideal scanning positions. The positional deviation amount as illustrated in FIG. 8B is hereinafter referred to as a shift amount of −0.2. In FIG. 8A and FIG. 8B, the scanning positions are shifted uniformly, and hence the interval between the scanning positions on the photosensitive drum 102 is 1 in both the cases.

Figure 8C:
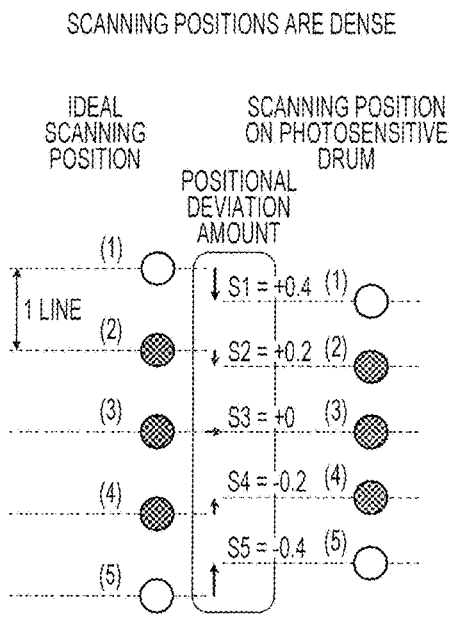

In FIG. 8C, the positional deviation amount is 0 at a predetermined scanning position on the photosensitive drum 102. However, as the scanning position returns backward from the scanning position of the positional deviation amount of 0, the positional deviation amount in the advance direction increases, and as the scanning position proceeds forward from the scanning position of the positional deviation amount of 0, the positional deviation amount in the return direction increases. For example, S3 is +0 in the scanning number (3), but S2 is +0.2 in the scanning number (2), S1 is +0.4 in the scanning number (1), S4 is −0.2 in the scanning number (4), and S5 is −0.4 in the scanning number (5). In FIG. 8C, the interval between the scanning positions is 0.8, which is smaller than 1. The state of positional deviation as illustrated in FIG. 8C is hereinafter referred to as being dense at an interval of a (1-0.2) line.

Figure 8D:
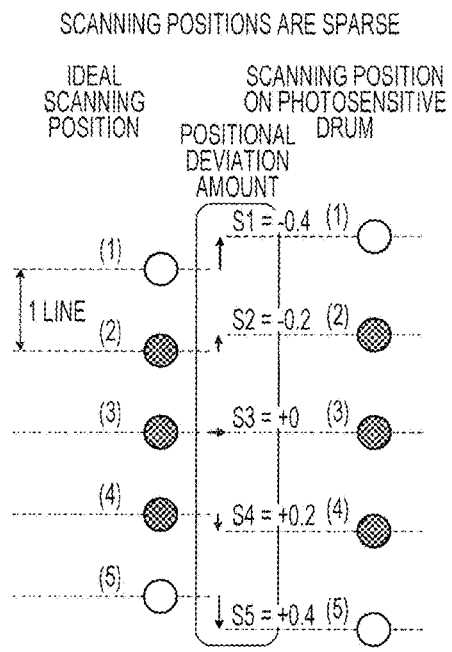

In FIG. 8D, the positional deviation amount is 0 at a predetermined scanning position on the photosensitive drum 102. However, as the scanning position returns backward from the scanning position of the positional deviation amount of 0, the positional deviation amount in the return direction increases, and as the scanning position proceeds forward from the scanning position of the positional deviation amount of 0, the positional deviation amount in the advance direction increases. For example, S3 is +0 in the scanning number (3), but S2 is −0.2 in the scanning number (2), S1 is −0.4 in the scanning number (1), S4 is +0.2 in the scanning number (4), and S5 is +0.4 in the scanning number (5). In FIG. 8D, the interval between the scanning positions is 1.2, which is larger than 1. The state of positional deviation as illustrated in FIG. 8D is hereinafter referred to as being sparse at an interval of a (1+0.2) line.

In the dense state as illustrated in FIG. 8C, positional deviation occurs, and in addition, the intervals between scanning positions are dense to cause pixels to be arranged densely on the photosensitive drum 102, with the result that a pixel value per predetermined area increases, to thereby increase density. In contrast, in the sparse state as illustrated in FIG. 8D, positional deviation occurs, and in addition, the intervals between scanning positions are sparse to cause pixels to be arranged sparsely on the photosensitive drum 102, with the result that a pixel value per predetermined area decreases, to thereby decrease density. In an electrophotographic process, a shading difference may be further emphasized due to a relationship between the depth of a latent image potential and development characteristics. Further, when the dense or sparse state occurs alternately as illustrated in FIG. 8C and FIG. 8D, a periodic shading causes moire, which is liable to be detected visually even at the same amount depending on a space frequency.

Referring back to the flowchart of FIG. 7, in S3603, the CPU 303 generates attribute information for correction of each pixel of an input image with the correction value setting portion 506. In the embodiment, the pixel position in the sub-scanning direction of an input image is subjected to coordinate transformation in advance and interpolated, thereby being capable of correcting positional deviation and correcting local shading simultaneously while maintaining density of the input image. The attribute information for correction specifically refers to a correction value CnN described later. In this case, "n" represents a scanning line number (or pixel number) in the sub-scanning direction, and N represents a pixel number in the main scanning direction. The correction value CnN means a correction value of the N-th pixel in the main scanning direction in the n-th scanning line in the sub-scanning direction. In the following description, the N-th pixel in the main scanning direction of each scanning line will be described, and the correction value CnN is simply referred to as C or Cn in some cases.

(Coordinate Transformation)

A method for coordinate transformation according to the embodiment will be described with reference to FIG. 9A to FIG. 11B. In each graph of FIG. 9A to FIG. 11B, the horizontal axis represents a pixel number "n", and the vertical axis represents a pixel position (which is also a scanning position) "y" (y' after the coordinate transformation) in the sub-scanning direction, with the unit being a line. Further, FIG. 9A, FIG. 9B, FIG. 11A, and FIG. 11B correspond to FIG. 8A to FIG. 8D, respectively. Each graph on the left side of FIG. 9A, FIG. 9B, FIG. 11A, and FIG. 11B represents the state before the coordinate transformation, and each graph on the right side thereof represents the state after the y-axis coordinate transformation. Square dots plotted in each graph represent scanning positions on the photosensitive drum 102, and circular dots therein represent ideal scanning positions.

(Case of Being Shifted in Advance Direction and Return Direction)

Figure 9A:
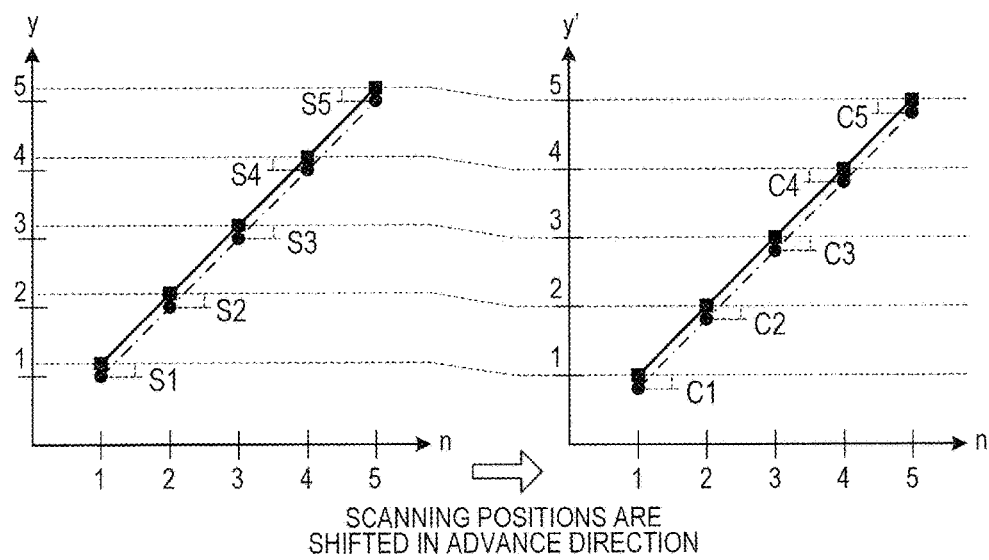
FIG. 9A and FIG. 9B are each a graph for showing coordinate transformation of pixel positions in a sub-scanning direction of the first and second embodiments.

The graph on the left side of FIG. 9A is first described. In the graph before the coordinate transformation, the ideal scanning position plotted with the circular dots is a position in which, for example, a pixel position "y" in the sub-scanning direction is 2 with respect to the pixel number 2. Thus, the y-coordinate of the pixel position "y" is equal to that of the pixel number "n", and the ideal scanning positions are represented by a straight line (indicated by the alternate long and short dash line) with a gradient of 1. The straight alternate long and short dash line is represented by Expression (7).

$$y=n \qquad \text{Expression (7)}$$

As illustrated in FIG. 8A, the scanning positions plotted with the square dots are shifted by S(=0.2) line in the advance direction (+ direction of y-axis) with respect to the ideal scanning positions plotted with the circular dots. Therefore, the scanning positions plotted with the square dots are represented by a straight line (indicated by the solid line) offset with the gradient being 1, which is represented by Expression (8).

$$y=n+S \qquad \text{Expression (8)}$$

In the embodiment, the coordinate transformation is performed so that the actual scanning positions are transformed into the ideal scanning positions. Therefore, in the example illustrated in FIG. 9A, it is only necessary that the coordinate transformation be performed with the use of Expression (9). In Expression (9), C represents a correction amount.

$$y'=y+C \qquad \text{Expression (9)}$$

Thus, the correction amount C is represented by a shift amount S and Expression (10).

$$C=-S \qquad \text{Expression (10)}$$

Through Expression (9) of the coordinate transformation and Expression (10) for determining the correction amount C, Expressions (7) and (8) are converted as represented by Expressions (11) and (12), respectively.

$$y'=y+C=n+(-S)=n-S \qquad \text{Expression (11)}$$

$$y'=y+C=(n+S)+C=(n+S)+(-S)=n \qquad \text{Expression (12)}$$

Figure 9B:
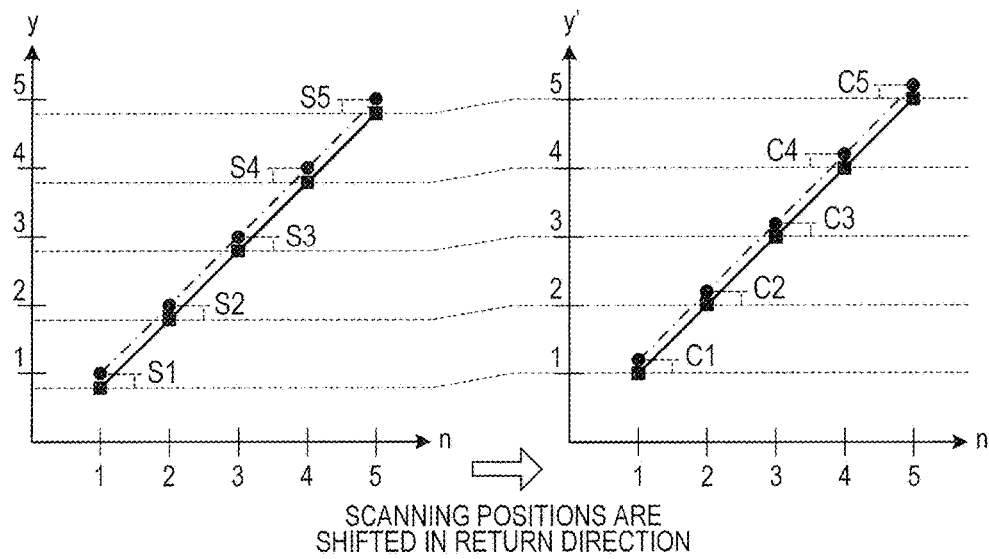

In FIG. 9B, when the shift amount S is defined as −0.2, Expression (12) similarly holds from Expression (7), and a similar description to that of FIG. 9A can be given. As illustrated in FIG. 9A and FIG. 9B, when the scanning lines are not sparse or dense, and are shifted in the advance direction or the return direction, a straight line has a predetermined gradient before and after the coordinate transformation.

(Case in which Dense or Sparse State Occurs)

Figure 10A:
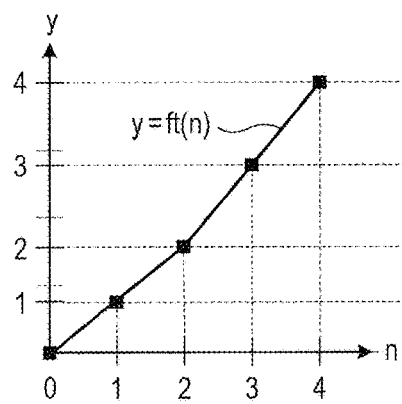
FIG. 10A, FIG. 10B, FIG. 10C, and FIG. 10D are each a graph for showing coordinate transformation of pixel positions in the sub-scanning direction of the first and second embodiments.

Now, the coordinate transformation will be described, the coordinate transformation being also applicable to the cases in FIG. 11A and FIG. 11B in which the scanning positions are dense or sparse, and the cases of combinations of FIG. 9A, FIG. 9B, FIG. 11A, and FIG. 11B in which a shift and a dense or sparse state occur. FIG. 10A is an illustration of a relationship between the pixel number and the scanning position. The horizontal axis represents the pixel number "n", and the vertical axis "y" represents a scanning position in the sub-scanning direction. Square dots are plotted as the scanning positions on the photosensitive drum 102. In FIG. 10A, the case is described in which the scanning lines are dense on the photosensitive drum 102 within a range of the pixel number of n≤2, and the scanning lines are sparse on the photosensitive drum 102 within a range of the pixel number of n≥2.

As illustrated in FIG. 10A, when the scanning lines are dense within the range of the pixel number of n≤2, and are sparse within the range of the pixel number of n≥2, the gradient of a straight line within the range of the pixel number of n≤2 is different from that of a straight line within the range of the pixel number of n≥2, and the straight line has a curved shape at the pixel number of n=2. In FIG. 10A, a function indicating a change in scanning positions passing through the square dots is defined as ft(n) and is represented by the solid line. The function ft(n) representing the scanning positions is represented by Expression (13).

$$y = ft(n) \quad \text{Expression (13)}$$

Next, when a function after the coordinate transformation of the y-axis that represents the scanning positions in the sub-scanning direction is defined as ft'(n), the function ft'(n) representing the scanning positions after the coordinate transformation is represented by Expression (14).

$$y' = ft'(n) \quad \text{Expression (14)}$$

In the embodiment, the coordinate transformation is performed by expanding or contracting the y-axis or shifting the y-axis so that the scanning positions after the coordinate transformation become uniform. Therefore, the function ft'(n) representing the scanning positions after the coordinate transformation satisfies the condition represented by Expression (15).

$$ft'(n) = n \quad \text{Expression (15)}$$

Expression (15) means that, for example, a pixel position y' (=ft'(2)) in the sub-scanning direction after the coordinate transformation becomes 2 with respect to the pixel number 2.

Figure 10B:
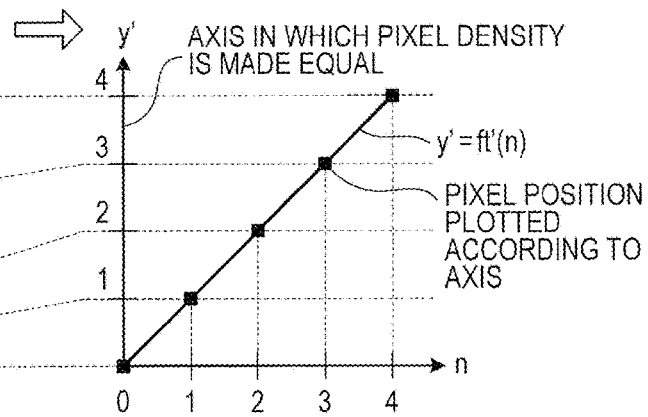
Figure 10C:
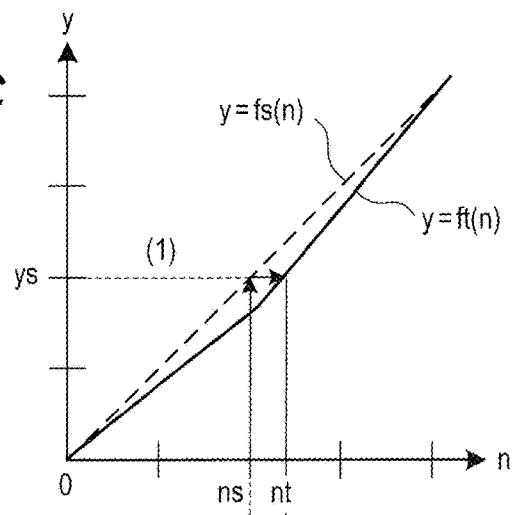
Figure 10D:
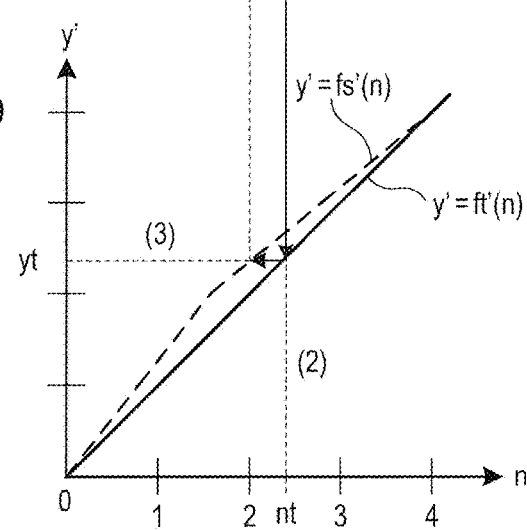

The broken lines connecting FIG. 10A and FIG. 10B to each other represent the correspondence from an original coordinate position of the y-axis to a coordinate position of the y'-axis after the coordinate transformation from the left to the right, and indicate a state in which a lower half (corresponding to n≤2) of the y-axis expands, and an upper half (corresponding to n≥2) contracts before and after the coordinate transformation. A procedure for determining a coordinate after the coordinate transformation of each pixel of input image data through the coordinate transformation of FIG. 10A and FIG. 10B will be described with reference to FIG. 10C and FIG. 10D. In the same manner as in FIG. 10A and FIG. 10B, the horizontal axis in FIG. 10C and FIG. 10D represents the pixel number "n", and the vertical axis "y" (or y') represents scanning positions in the sub-scanning direction. FIG. 10C is an illustration before the coordinate transformation, and FIG. 10D is an illustration after the coordinate transformation. A relationship between the pixel number "n" and the coordinate position "y" of the input image data will be described below. First, the broken line of FIG. 10C represents a function fs(n) representing ideal scanning positions before the coordinate transformation and is represented by Expression (16).

$$y = fs(n) \quad \text{Expression (16)}$$

Further, in the embodiment, the interval between the pixels in the sub-scanning direction of the input image data is uniform, and hence the function fs(n) is represented by Expression (17).

$$fs(n) = n \quad \text{Expression (17)}$$

A scanning position of the y'-coordinate after the coordinate transformation of a pixel number of interest "ns" of the input image data is determined through three steps described below. In the first step, when the y-coordinate of an ideal scanning position corresponding to the pixel number "ns" of the input image data is defined as "ys", "ys" can be determined by Expression (18).

$$ys = fs(ns) \quad \text{Expression (18)}$$

A pixel number "nt" in which the scanning position before the coordinate transformation is the same on the photosensitive drum 102 (solid line) is determined ((1) of FIG. 10C). The scanning position on the photosensitive drum 102 is represented by the function y=ft(n), and a relationship of ys=ft(nt) holds. When an inverse function of the function ft(n) is defined as $ft^{-1}(y)$, the pixel number "nt" is represented by Expression (19).

$$nt = ft^{-1}(ys) \quad \text{Expression(19)}$$

In the second step, the y'-coordinate after the coordinate transformation (defined as "yt") corresponding to the pixel number "nt" of the scanning position on the photosensitive drum 102 is determined by Expression (20) with the use of the function ft'(n) after the coordinate transformation ((3) of FIG. 10D).

$$yt = ft'(nt) \quad \text{Expression (20)}$$

The pixel number "ns" holds even when any number is selected, and hence an expression for determining the position "yt" of the y'-coordinate after the coordinate transformation based on the pixel number "ns" corresponds to the function fs'(n) for determining the y'-coordinate by calculation based on the pixel number "n" of the input image data. Thus, a general expression represented by Expression (21) is derived from Expressions (18) to (20). A function indicating the ideal scanning position represented by the broken line after the coordinate transformation is represented by y'=fs'(n) ((3) of FIG. 10D).

yt=fs'(ns)=ft'(nt)=ft'($ft^{-1}$(ys))=ft'($ft^{-1}$(fs(ns))) "ns" is generalized into "n" to obtain Expression (21).

$$fs'(n) = ft'(ft^{-1}(fs(n))) \quad \text{Expression (21)}$$

Further, Expression (17) and Expression (15) in which the pixel interval of the input image data and the interval of the scanning positions after the coordinate transformation are set to be uniform, with the distance of 1, are substituted into Expression (21). Then, Expression (21) is represented by Expression (22) with the use of the inverse function $ft^{-1}(n)$ of the function ft(n) for deriving the scanning position from the pixel number "n".

$$fs'(n) = ft^{-1}(n) \quad \text{Expression (22)}$$

Expression (8) in which the scanning positions are shifted uniformly in the advance direction and the return direction as illustrated in FIG. 9A and FIG. 9B, and Expression (11) for determining a position after the coordinate transformation of the input image data also have an inverse function relationship, and it can be confirmed that Expression (22)

holds. Further, when applied to the case in which the dense or sparse state of the scanning positions occurs as illustrated in FIG. 11A and FIG. 11B, the function "y" representing scanning positions before the coordinate transformation is represented by Expression (23) when the function "y" is a straight line with a gradient "k", passing through (n0, y0).

$$fs(n)=y=k\times(n-n0)+y0 \qquad \text{Expression (23)}$$

In order to determine a pixel position after the coordinate transformation of the y-axis of the input image data, it is only necessary that an inverse function $((1/k)\times(y-y0)+n0)$ be determined by Expressions (21) and (22), and the pixel number "n" be substituted into the inverse function, and hence Expression (24) is derived.

$$y'=(1/k)\times(n-y0)+n0 \qquad \text{Expression (24)}$$

Figure 11A:
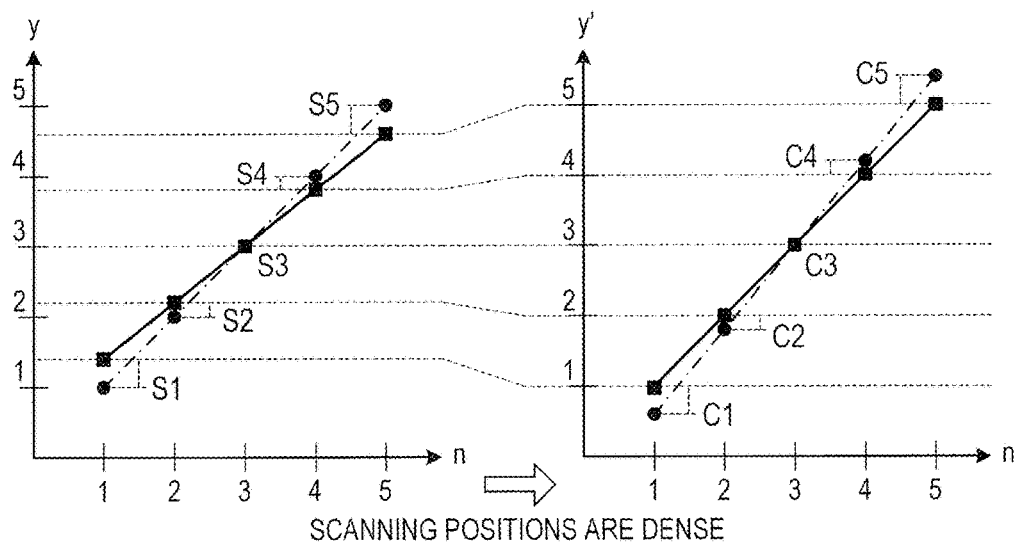
FIG. 11A and FIG. 11B are each a graph for showing coordinate transformation of pixel positions in the sub-scanning direction of the first and second embodiments.
Figure 11B:
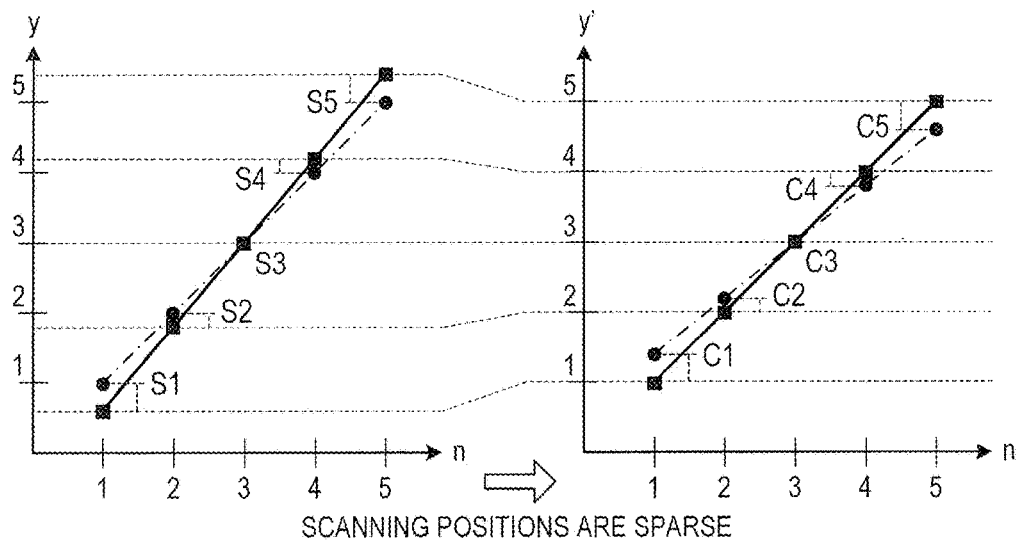

When the intervals between the scanning lines illustrated in FIG. 11A are dense, and the intervals between the scanning lines illustrated in FIG. 11B are sparse, the positions of the scanning lines on the photosensitive drum 102 after the coordinate transformation can be represented by Expression (24) in both the cases. Further, a correction value Cn of the pixel number "n" in the sub-scanning direction is determined by $Cn=fs'(n)-fs(n)$.

Specifically in FIG. 11A, n0=y0=3 and k=0.8 are satisfied, and Expression (25) is obtained.

$$fs'(n)=(1/0.8)\times(n-3)+3 \qquad \text{Expression (25)}$$

For example, in the pixel number 3, fs'(3)=3.00 is satisfied, and the correction value C3 is 0.00 (=3.00-3.00). Further, in the pixel number 5, fs'(5)=5.50 is satisfied, and the correction value C5 is +0.50 (=+5.50-5.00). The correction values C1 to C5 when the scanning positions are dense are illustrated in FIG. 13C.

Further, in FIG. 11B, n0=y0=3, and k=1.2 are satisfied, and Expression (26) is obtained.

$$fs'(n)=(1/1.2)\times(n-3)+3 \qquad \text{Expression (26)}$$

For example, in the pixel number 3, fs'(3)=3.000 is satisfied, and the correction value C3 is 0.000 (=3.000-3.000). Further, in the pixel number 5, fs'(5)=4.667 is satisfied, and the correction value C5 is -0.333 (=4.667-5.000). The correction values C1 to C5 when the scanning positions are sparse are illustrated in FIG. 13D.

Further, even when a dense or sparse state and a shift are mixed in the scanning lines, an ideal scanning position after the coordinate transformation can be determined with the use of Expression (21) or (22). The correction value setting portion 506 is configured to subject an ideal scanning position to the coordinate transformation based on a positional deviation amount to determine the correction value CnN, and output information on the correction value CnN to the filter coefficient setting portion 504.

(Filtering)

In the embodiment, the filtering is performed in order to generate correction data. In the embodiment, the filtering portion 501 is configured to perform the filtering through a convolution operation based on the following filter function. That is, the filtering portion 501 performs the filtering based on a positional relationship between the pixel positions in the sub-scanning direction of pixels obtained by correcting scanning positions in the sub-scanning direction of pixels of the input image data, and positions of pixels in the sub-scanning direction having an interval between scanning lines transformed uniformly by the coordinate transformation. A pixel before the filtering is also referred to as an input pixel, and a pixel after the filtering is also referred to as an output pixel. Further, a pixel before the filtering is a pixel subjected to the above-mentioned coordinate transformation.

Figure 12A:
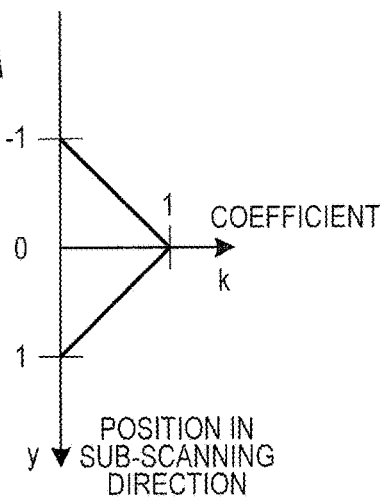
FIG. 12A, FIG. 12B, and FIG. 12C are each a graph for showing a convolution function to be used in filtering of the first and second embodiments.
Figure 12B:
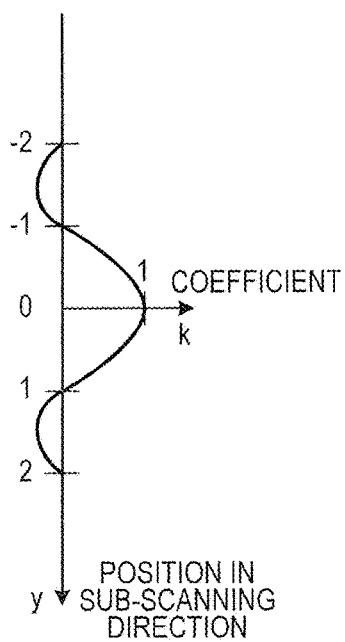
Figure 12C:
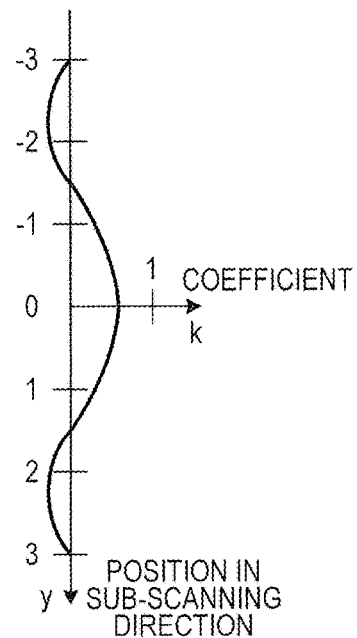

The convolution function according to the embodiment can be selected from linear interpolation illustrated in FIG. 12A, and bicubic interpolation illustrated in FIG. 12B and FIG. 12C. The filter function output portion 505 outputs information on the convolution function used in the filtering to the filter coefficient setting portion 504 as information of the table, for example. In FIG. 12A to FIG. 12D, the vertical axis "y" represents a position in the sub-scanning direction, with a unit being a pixel, and a horizontal axis "k" represents a magnitude of a coefficient. Although the unit of the vertical axis "y" is set to a pixel, a line may be used as a unit because the sub-scanning direction is illustrated.

The expression of FIG. 12A is represented by Expression (27).

$$k=y+1 \quad (-1 \leq y \leq 0)$$

$$k=-y+1 \quad (0 < y \leq 1)$$

$$0 \quad (y<-1, y>1) \qquad \text{Expression (27)}$$

Expressions of FIG. 12B and FIG. 12C are represented by the following two expressions.

$$bicubic(t) = \begin{cases} (a+2)|t|^3 - (a+3)|t|^2 + 1 & (|t| \leq 1) \\ a|t|^3 - 5a|t|^2 + 8a|t| - 4a & (1 < |t| \leq 2) \\ 0 & (2 < |t|) \end{cases} \qquad \text{Expression (28)}$$

$$k = bicubic\left(\frac{y}{w}\right)/w \qquad \text{Expression (29)}$$

In the embodiment, a is set to -1, and "w" is set to 1 in FIG. 12B and set to 1.5 in FIG. 12C, but "a" and "w" may be adjusted in accordance with the electrophotographic characteristics of each image forming apparatus. The filter coefficient setting portion 504 is configured to output a coefficient ("k" described later) to be used in the filtering to the filtering portion 501 based on the information on the filter function obtained from the filter function output portion 505 and the information on the correction value C output from the correction value setting portion 506.

Figure 12D:
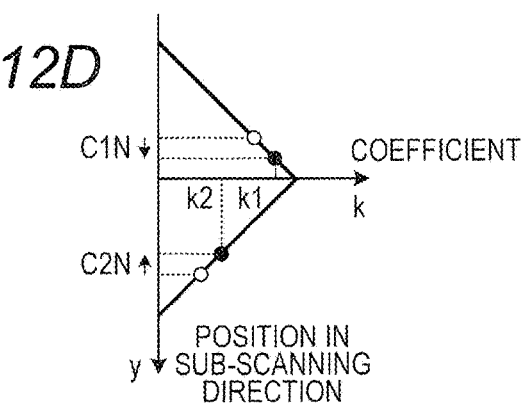
FIG. 12D is a graph for showing a correction value and a coefficient.

Now, description is given with reference to FIG. 12D. In FIG. 12D, the horizontal axis represents a coefficient "k" to be used in the filtering, and the vertical axis represents a position "y" in the sub-scanning direction. When the filtering portion 501 receives the correction value CnN from the correction value setting portion 506, the filtering portion 501 determines a coefficient "kn" corresponding to the correction value CnN with the use of the filter function input from the filter function output portion 505. White circles of FIG. 12D represent coefficients before the coordinate transformation. Further, in FIG. 12D, it is illustrated that coefficients k1 and k2 were set with respect to a correction value C1N and a correction value C2N, respectively, as coefficients "kn" to be used in the filtering (black circles). In the embodiment, the same convolution function is applied irrespective of whether the input image data is dense or sparse, and sampling is performed at an ideal scanning position, to thereby store density per predetermined area of the input image data.

(Specific Example of Filtering)

A specific example of performing the filtering with the use of the convolution operation with a filter function by linear interpolation of Expression (27) based on a coordinate position after the coordinate transformation of the embodiment will be described with reference to FIG. 13A, FIG.

13B, FIG. 13C, and FIG. 13D. The filtering using the convolution operation is performed by the filtering portion 501. FIG. 13A to FIG. 13D correspond to FIG. 8A to FIG. 8D, respectively. Each column on the left side of FIG. 13A to FIG. 13D represents input pixels after the above-mentioned coordinate transformation. Further, each column on the right side of FIG. 13A to FIG. 13D represents scanning positions on the photosensitive drum 102 after the above-mentioned coordinate transformation. That is, the scanning positions in each column on the right side of FIG. 13A to FIG. 13D have been subjected to the coordinate transformation so as to have a uniform interval and a distance of 1.

More specifically, the scanning positions in the sub-scanning direction of input pixels after the coordinate transformation are represented by a straight line ($y'=fs'(n)$) indicated by the alternate long and short dash line of the graph after the coordinate transformation illustrated on the right side of FIG. 9A, FIG. 9B, FIG. 11A, and FIG. 11B. The scanning positions on the photosensitive drum 102 after the coordinate transformation are represented by a straight line ($y'=fs'(n)$) indicated by the solid line of the graph after the coordinate transformation illustrated on the right side of FIG. 9A, FIG. 9B, FIG. 11A, and FIG. 11B. For example, in FIG. 9A, the shift amount is +0.2 (=S), and hence $fs'(n)=y-0.2=n-0.2$ is satisfied after the coordinate transformation.

Further, in FIG. 13A to FIG. 13D, the magnitude of a pixel value, that is, a density value is represented by shading of circles. Further, numbers in parentheses indicate numbers of scanning lines, and are the same as the pixel numbers illustrated in FIG. 8A to FIG. 8D. In each graph at the center of FIG. 13A to FIG. 13D, the horizontal axis represents density, and the vertical axis represents a position in the sub-scanning direction. The convolution operation involves developing waveforms W (W1 to W5 with respect to the pixels (1) to (5)) obtained by multiplying the filter function based on each coordinate position of an input image (FIG. 12A) by a pixel value, and adding the waveforms W by superimposing.

FIG. 13A will be described first. The pixels (1) and (5) represented by white circles have a density of 0, that is, a pixel value of 0. Therefore, W1 and W5 obtained by multiplying a filter function by a pixel value are both 0. The pixels (2), (3), and (4) represented by black circles have the same density, and the maximum values of the waveforms W2, W3, and W4 are the same. Thus, the pixels (2), (3), and (4) each result in a waveform obtained by developing the filter function based on the pixel position of the input pixel. The result of the convolution operation is a sum ($\Sigma Wn$, n=1 to 5) of all the waveforms.

A pixel value of an output pixel is sampled at the scanning position on the photosensitive drum 102 after the scanning position is subjected to the coordinate transformation. Therefore, for example, the pixel value (1) corresponding to the scanning position on the photosensitive drum 102 intersects with the waveform W2 at a point P0, and hence is calculated to be density D1. Further, the pixel value (2) intersects with the waveform W2 at a point P2 and the waveform W3 at a point P1, respectively, and hence is calculated to be density D1+D2. The pixel values (3) to (5) are subsequently determined in a similar manner. The pixel value (5) does not intersect with any waveform, and hence the pixel value thereof is set to 0. Further, the result obtained by calculating the pixel values (1) to (5) of FIG. 13B to FIG. 13D are represented by shading of pixels in each column on the right side.

The positional deviation of the input pixels is illustrated so as to correspond to each pixel on the vertical axis of FIG. 13A to FIG. 13D. The positional deviation amount represented by the vertical axis of FIG. 13A to FIG. 13D is information on the positional deviation amount determined by an inverse function in accordance with the coordinate transformation of the scanning positions in the sub-scanning direction of the pixels of the input image. For example, in the case of FIG. 13A, as described with reference to FIG. 9A, the correction amount C of the positional deviation amount S of the scanning lines is −0.2. Further, for example, in the cases of FIG. 13C and FIG. 13D, the correction amounts C are calculated with the use of Expressions (25) and (26), respectively.

FIG. 13A is an illustration of a state in which the scanning positions of the scanning lines are shifted in the advance direction in the sub-scanning direction, but the centers of gravity of the pixel values are shifted in the return direction, and hence the positions of the centers of gravity of the pixel values are corrected. FIG. 13B is an illustration of a state in which the scanning positions of the scanning lines are shifted in the return direction in the sub-scanning direction, but the centers of gravity of the pixel values are shifted in the advance direction, and hence the positions of the centers of gravity of the pixel values are corrected. FIG. 13C is the case in which the intervals between the scanning positions are dense, and is an illustration of a state in which the distribution of density is widened due to the convolution operation after the coordinate transformation to cancel the local concentration of density, to thereby correct a local change in density. Further, FIG. 13D is the case in which the intervals between the scanning positions are sparse, and is an illustration of a state in which the distribution of density is narrowed due to the convolution operation after the coordinate transformation to cancel the dispersion of density, to thereby correct a local change in density. In particular, the pixel value (3) of FIG. 13D is a density of (100+a) % which is higher than 100%.

(Filtering)

Figure 14:
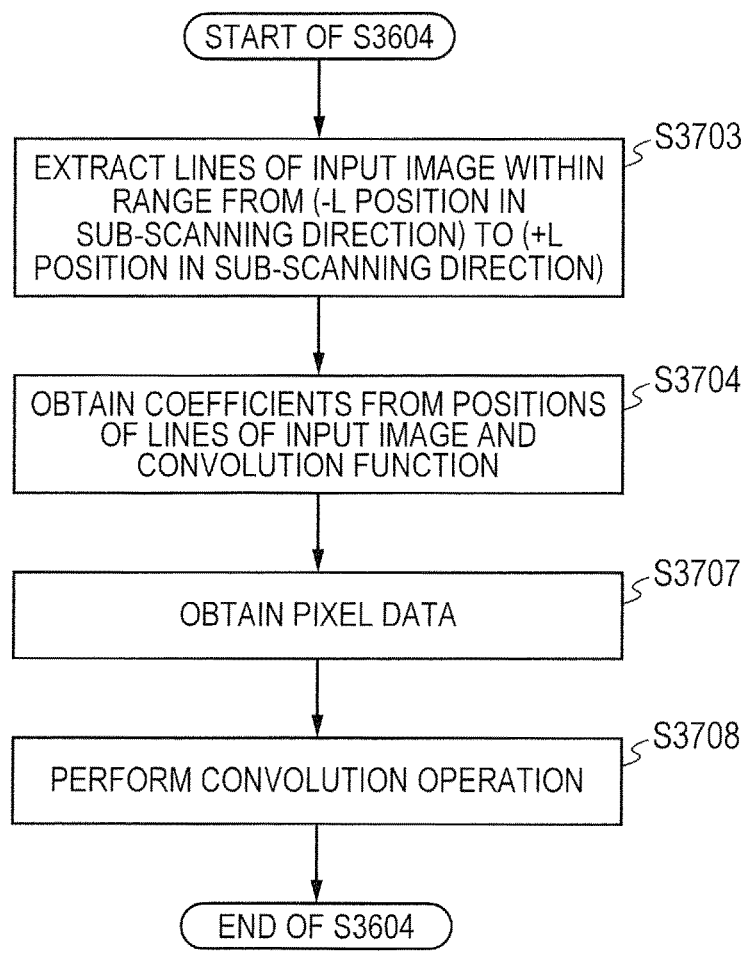
FIG. 14 is a flowchart for illustrating the filtering of the first and second embodiments.

Referring back to FIG. 7, in S3604 of FIG. 7, the CPU 303 performs the filtering with the filtering portion 501 based on the attribute information for correction generated in S3603. Specifically, the CPU 303 performs a convolution operation and re-sampling with respect to the above-mentioned input image. The processing of S3604 performed by the CPU 303 will be described below in detail with reference to the flowchart of FIG. 14. When the CPU 303 starts the filtering through the convolution operation with the filtering portion 501, the CPU 303 performs the processing in S3703 and subsequent steps.

In S3703, when the spread of the convolution function is defined as L, the CPU 303 extracts lines of an input image within a range of before and after ±L of the position in the sub-scanning direction of a line "yn" (position "yn") of an output image of interest, that is, the range of a width of 2 L (range of from (yn−L) to (yn+L)). In this case, L is defined as a minimum value at which the value of the convolution function becomes 0 outside of the range of from +L to −L of the convolution function. For example, in the linear interpolation of FIG. 12A, L is equal to 1. In the bicubic interpolation of FIG. 12B, L is equal to 2. In the bicubic interpolation of FIG. 12C, L is equal to 3. The ymin and ymax within a range of from ymin to ymax of the corresponding input image satisfy the following condition with the use of Expression (22).

$$ft^{-1}(y\min)=yn-L, ft^{-1}(y\max)=yn+L \quad \text{Expression (30)}$$

When Expression (30) is modified, ymin and ymax are determined by Expression (31).

$$ymin=ft(yn-L), ymax=ft(yn+L) \quad \text{Expression (31)}$$

Thus, the lines of the input image to be extracted with respect to the line "yn" of the output image of interest are lines of all the integers within a range of from ymin to ymax.

When the line of the output image of interest is denoted by "yn", and the line of the input image to be subjected to the convolution operation is denoted by "ym", a distance "dnm" is represented by Expression (32).

$$dnm=yn-ft^{-1}(ym) \quad \text{Expression (32)}$$

Thus, in S3704, the CPU 303 obtains a coefficient "knm" as a convolution function g(y) with the filter coefficient setting portion 504 by Expression (33).

$$knm=g(dnm) \quad \text{Expression (33)}$$

In S3707, the CPU 303 obtains pixel data on the position n in the sub-scanning direction in the input image extracted in S3703 and the position N of interest in the main scanning direction. The pixel data is defined as input pixel data $Pin_m$. In S3708, the CPU 303 performs the convolution operation with the filtering portion 501, to thereby end the processing. More specifically, the filtering portion 501 subjects the corresponding coefficient "knm" determined in S3704 and the input pixel data $Pin_m$ obtained in S3707 to a product-sum operation, to thereby determine a value $Pout_n$ of the pixel of interest. The input pixel data $Pin_m$ is density of the pixel of interest before the filtering, and the value $Pout_n$ of the pixel of interest is output pixel data and is density of the pixel of interest after the filtering.

$$Pout_n = \sum_m^{all} k_{nm} \cdot Pin_m \quad \text{Expression (34)}$$

Expression (34) corresponds to FIG. 13A to FIG. 13D. The darkness (density) of the circles on the left side in FIG. 13A to FIG. 13D corresponds to the input pixel data $Pin_m$. D1 and D2 in FIG. 13A correspond to knm×$Pin_m$. The darkness (density) of the circles on the right side in FIG. 13A to FIG. 13D corresponds to $Pout_n$.

Thus, in the embodiment, distortion and uneven image density of an image caused by the deviation of an irradiation position due to a variation in arrangement intervals of light emitting points of a laser light source and the optical face tangle error of the mirror faces of the rotary polygon mirror 204 are corrected as follows. First, a pixel position of an input image is subjected to the coordinate transformation based on a profile of positional deviation in the sub-scanning direction of the input image. Then, the filtering and sampling are performed, thereby being capable of cancelling positional deviation and local biased density such as banding while maintaining the density of each input image, with the result that a satisfactory image can be obtained. In the embodiment, a positional deviation amount in the sub-scanning direction can be calculated in consideration of different optical face tangle errors of the rotary polygon mirror 204 in the main scanning direction.

First Embodiment

<Chart Output>

In the first embodiment, a user or a service person performs visual judgement with the use of a test chart and inputs the above-mentioned amplitude gain Gb through a user interface. In the embodiment, a method of determining the amplitude gain Gb for adjusting (correcting) a banding correction amount described in Expression (2) will be described in detail.

FIG. 15D is an illustration of a test chart. Images (hereinafter referred to as "patches") for determining the amplitude gain Gb are formed on the surface of a sheet S of an A4 size. A total of 25 patches are arranged on the sheet S so that 5 patches are arranged in the vertical direction (sub-scanning direction) and 5 patches are arranged in the horizontal direction (main scanning direction). In this case, the patches arranged in the main scanning direction are images having the same amplitude gain Gb. The patches arranged in the sub-scanning direction are images corresponding to image data subjected to filtering with the use of different amplitude gains Gb.

FIG. 15A is a graph for showing the mirror faces A to E of the rotary polygon mirror 204, that is, a phase of rotation of the rotary polygon mirror 204 in the horizontal axis, and an amount of optical face tangle (Am) of the mirror faces of the rotary polygon mirror 204 in the vertical axis. As shown in FIG. 15A, an amount of optical face tangle of 0 to the maximum value thereof are set to an amplitude Am of a reference profile. The reference profile is a profile specific to each light scanning device, and the amplitude Am is the above-mentioned amount of optical face tangle Ybm. In the embodiment, as described above, the amplitude Am (=Ybm) of the reference profile is stored in advance in the memory 302 of the light scanning device 104 at the time of factory shipment or the like. FIG. 15B is an illustration of a part of the memory 302. The memory 302 stores the amplitude Am (=Ybm) of the reference profile of each of the mirror faces A to E of the rotary polygon mirror 204, for each block obtained through the division in the main scanning direction for each mirror face.

The images of the patches formed on the sheet S are subjected to filtering based on a profile obtained by multiplying the amplitude Am of the reference profile stored in the memory 302 by the amplitude gain Gb. As the image, a generally used screen image is used. An image in which banding caused by an optical face tangle error is visually recognized easily may be used.

The patches on the test chart are printed at positions corresponding to five correction blocks (b=1 to 5 described above) obtained through the division in the main scanning direction. In this case, the five correction blocks correspond to five blocks of one mirror face of the rotary polygon mirror 204. The patches in the sub-scanning direction include the amplitude gain Gb corresponding to an upper limit value of a focus tolerance with the patch having the amplitude gain Gb of 0 being the center, and the amplitude gain Gb is gradually changed. Here, the upper limit value of the focus tolerance is represented by ±Xg, and an intermediate value from 0 to Xg is presented by ±Yg. (A) of FIG. 15C represents a profile (Am×(+Xg)) when the amplitude gain Gb is set to +Xg, and (B) of FIG. 15C represents a profile (Am×0) when the amplitude gain Gb is set to 0. (C) of FIG. 15C represents a profile (Am×(−Xg)) when the amplitude gain Gb is set to −Xg. In each profile, the horizontal axis represents a mirror face of the rotary polygon mirror 204, and the vertical axis represents an amount of optical face tangle.

In the sub-scanning direction of the sheet S, the patches, which are formed by filtering, are arranged based on positional deviation amounts calculated with the use of the five amplitude gains Gb of +Xg, +Yg, 0, −Yg, and −Xg. An operation portion (not shown) of the image forming apparatus 100 includes an execution button configured to designate printing execution of the above-mentioned test chart, and the user or the service person can print the test chart by pressing the execution button at any timing.

After the test chart is printed, the user or the service person selects a patch having banding in the smallest amount from the five patches in the sub-scanning direction by visually inspecting the test chart or with the use of an analysis device capable of mechanically analyzing the amount of banding. In other words, the user or the service person selects the amplitude gain Gb having banding in the smallest amount. Here, it is assumed that the user or the service person determines the amplitude gain Gb for each five blocks in the main scanning direction. For example, when a patch formed by correcting a block 1 with the amplitude gain Gb being set to "−Yg" has banding in the smallest amount, "−Yg" is selected as an amplitude gain G1 of the block 1. Further, for example, when a patch formed by correcting a block 3 with the amplitude gain Gb being set to "+Xg" has banding in the smallest amount, "+Xg" is selected as an amplitude gain G3 of the block 3. Thus, the user or the service person inputs, through the operation portion (not shown), a value of the amplitude gain Gb (b=1 to 5) of a patch having the amount of banding reduced most, depending on the above-mentioned five blocks obtained through the division in the main scanning direction. After the amplitude gain Gb is selected with the use of the test chart as described above, a positional deviation amount is determined by Expression (2) with the use of the selected amplitude gain Gb, and filtering and the like are performed based on the determined positional deviation amount, to thereby correct the image data. As described above, in the embodiment, gain adjustment is performed with the use of the amplitude gain Gb selected with the use of the test chart, and banding is corrected in accordance with focus deviation in the main scanning direction specific to a main body of the image forming apparatus 100.

In the embodiment, uneven image density can be reduced even when focus deviation of a laser beam radiated on a photosensitive member from a light scanning device occurs due to a variation on an image forming apparatus side and a mounting error of the light scanning device.

Second Embodiment

<Calculation of Optimum Gain Gb Based on Focus Distance Information>

In the second embodiment, a method involving storing in the memory 302 focus distance information Δxb (b=1 to 5) measured in advance and calculating an amplitude gain Gb for adjusting a banding correction amount based on the focus distance information Δxb will be described. The focus distance information Δxb corresponds to a illustrated in FIG. 17A. Parts having configurations different from those of the first embodiment are described in detail, and the same configurations are described with the use of the same reference symbols. Further, in the embodiment, in FIG. 1B, the image data is input to the CPU 303 but the amplitude gain Gb is not input thereto, and the configurations of the photosensitive drum 102, the light scanning device 104, and a control portion of the light scanning device 104 are the same as those of the first embodiment.

The distance from a mounting seat surface of the light scanning device 104 of the image forming apparatus 100 to the surface of the photosensitive drum 102 is measured in an assembly adjusting step of the image forming apparatus 100 and information of the measured distance is stored in the memory 302 as the focus distance information Δxb. The focus distance information Δxb contains pieces of data separately corresponding to the blocks 1 to 5 obtained through the division in the main scanning direction.

An address map storing the focus distance information Δxb is shown in Table 2. In the same manner as in Table 1 of the first embodiment, position information of a laser beam and face information are also stored in the address map of Table 2. Addresses 1 to 32 are the same as those of Table 1, and hence description thereof is omitted. In addresses 33 to 37 of the memory 302, focus distance information Δx1 to Δx5 are stored so as to correspond to the five blocks in the main scanning direction.

TABLE 2

| Address | Data |
| --- | --- |
| 1 | LD2 position information X1 |
| 2 | LD3 position information X2 |
| 3 | LD4 position information X3 |
| 4 | LD5 position information X4 |
| 5 | LD6 position information X5 |
| 6 | LD7 position information X6 |
| 7 | LD8 position information X7 |
| 8 | Face A position information Y1A |
| 9 | Face A position information Y2A |
| 10 | Face A position information Y3A |
| 11 | Face A position information Y4A |
| 12 | Face A position information Y5A |
| 13 | Face B position information Y1B |
| 14 | Face B position information Y2B |
| 15 | Face B position information Y3B |
| 16 | Face B position information Y4B |
| 17 | Face B position information Y5B |
| 18 | Face C position information Y1C |
| 19 | Face C position information Y2C |
| 20 | Face C position information Y3C |
| 21 | Face C position information Y4C |
| 22 | Face C position information Y5C |
| 23 | Face D position information Y1D |
| 24 | Face D position information Y2D |
| 25 | Face D position information Y3D |
| 26 | Face D position information Y4D |
| 27 | Face D position information Y5D |
| 28 | Face E position information Y1E |
| 29 | Face E position information Y2E |
| 30 | Face E position information Y3E |
| 31 | Face E position information Y4E |
| 32 | Face E position information Y5E |
| 33 | Focus distance information $\Delta \times 1$ |
| 34 | Focus distance information $\Delta \times 2$ |
| 35 | Focus distance information $\Delta \times 3$ |
| 36 | Focus distance information $\Delta \times 4$ |
| 37 | Focus distance information $\Delta \times 5$ |

The CPU 303 reads the focus distance information Δxb from the memory 302 and calculates the amplitude gain Gb described later.

FIG. 16C is a graph for showing a relationship between the focus distance information Δxb (hereinafter referred to as "focus distance error") and the amplitude gain Gb. FIG. 16C is a graph for showing the focus distance error Δxb in the horizontal axis and the amplitude gain Gb in the vertical axis. As described above, the amplitude gain Gb changes depending on the focus distance error Δxb(a) which is also a focus deviation amount. Specifically, when the focus distance error Δxb increases, the amplitude gain Gb also increases. Further, FIG. 16A and FIG. 16B are each a graph for showing a mirror face of the rotary polygon mirror 204 in the horizontal axis and an amount of optical face tangle in the vertical axis. As shown in FIG. 16A and FIG. 16B, the amount of optical face tangle changes depending on the amplitude gain Gb. Specifically, when the amplitude gain Gb increases, the amount of optical face tangle also increases. As a result, when the focus distance error Δxb which is a focus deviation amount increases, the amount of optical face tangle also increases. In this case, the focus deviation amount and the amount of optical face tangle are uniquely determined by optical characteristics of a light scanning device. A function of the focus distance error Δxb and the amplitude gain Gb shown in FIG. 16C is for showing a relationship between the focus distance error Δxb and the amplitude gain Gb in a simplified manner for the purpose of simplification of description, and is represented by, for example, a linear function. Depending on the optical design condition, the optical scanning device may have non-linear characteristics. The above-mentioned function is determined based on a design value determined in optical design.

A function of the focus distance error Δxb and the amplitude gain Gb in the embodiment is represented by a linear function of a gradient R. In Expression (35), the amplitude gain Gb is determined with the use of the gradient R.

$$Gb = \Delta xb \times R \quad \text{Expression (35)}$$

(b=1 to 5)

As described above, when the focus distance error (focus deviation amount) increases, the amount of optical face tangle also increases. Therefore, it is understood from Expression (35) that, when the amount of optical face tangle increases, the amplitude gain Gb also increases. As shown in FIG. 16A, when the optical face tangle error is small, the amplitude gain is also small. As shown in FIG. 16B, when the amount of optical face tangle increases, the amplitude gain also increases. The subsequent processing, specifically, the calculation of a positional deviation amount with the use of the amplitude gain Gb, the filtering with the use of a positional deviation amount, and the like are performed in the same manner as in the first embodiment, and description thereof is omitted.

Through the above-mentioned operations, in the embodiment, the amplitude gain Gb can be calculated to calculate the amount of optical face tangle in the main body of the image forming apparatus 100 without using the test chart. A variation in each image forming apparatus can be addressed by holding the focus distance information (focus position deviation) Δxb of the image forming apparatus 100 in the memory 302. Therefore, even when a light scanning device is replaced for maintenance or the like, correction can be made with an optimum banding correction amount without performing a special operation.

As described above, in the embodiment, uneven image density can be reduced even when focus deviation of a laser beam radiated on a photosensitive member from a light scanning device occurs due to a variation on an image forming apparatus side and a mounting error of the light scanning device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-011258, filed Jan. 25, 2016, which is hereby incorporated by reference herein in its entirety.

What is claimed is:

1. An image forming apparatus, comprising:
   a light source comprising a plurality of light emitting points;
   a photosensitive member configured to rotate in a first direction so that a latent image is formed on the photosensitive member by light beams emitted from the light source;
   a deflection unit configured to deflect the light beams emitted from the light source with a mirror face and cause light spots of the light beams radiated on the photosensitive member to be moved in a second direction orthogonal to the first direction to form scanning lines;
   a storage unit configured to store information on positional deviation of the plurality of light emitting points in the first direction and information on an optical face tangle error of the mirror face of the deflection unit in accordance with the second direction;
   a correction unit configured to correct the information on the optical face tangle error stored in the storage unit, based on a deviation amount from a predetermined distance between the deflection unit and the photosensitive member;
   a calculation unit configured to calculate a positional deviation amount based on the information on the positional deviation stored in the storage unit and the information on the optical face tangle error corrected by the correction unit;
   a transformation unit configured to transform a position of a pixel of an input image by performing coordinate transformation based on the positional deviation amount calculated by the calculation unit so that an interval between the scanning lines on the photosensitive member becomes a predetermined interval; and
   a filtering unit configured to obtain a pixel value of a pixel of an output image by subjecting a pixel value of the pixel of the input image to a convolution operation based on the position of the pixel of the input image after the coordinate transformation.

2. An image forming apparatus according to claim 1, wherein the storage unit divides the mirror face of the deflection unit into a predetermined number of blocks in the second direction and stores the information on the optical face tangle error for each of the divided blocks.

3. An image forming apparatus according to claim 2, further comprising:
   an image forming unit configured to form an image on a recording medium; and
   a setting unit configured to set a gain for correcting the information on the optical face tangle error stored in the storage unit based on the deviation amount from the predetermined distance,
   wherein the setting unit causes the image forming unit to form a plurality of images each having a different gain on the recording medium in the first direction, and sets a gain corresponding to an image selected from the plurality of images for each of the blocks.

4. An image forming apparatus according to claim 2,
   wherein the storage unit stores information on the deviation amount from the predetermined distance for each of the blocks in advance, and
   wherein the calculation unit calculates a gain for correcting the information on the optical face tangle error based on the information on the deviation amount from the predetermined distance stored in the storage unit.

5. An image forming apparatus according to claim 4, wherein the filtering unit performs the convolution operation with use of linear interpolation or bicubic interpolation.

6. An image forming apparatus according to claim 4, wherein the pixel value comprises a density value, and wherein a density value per predetermined area is stored before and after the filtering unit performs the convolution operation.

7. An image forming apparatus according to claim 4, wherein the filtering unit obtains, when a width in the first direction within a range excluding 0 of a convolution function to be used for the convolution operation is defined as 2 L, a range of from ymin to ymax of pixels of the input image corresponding to a range of the width of 2 L with a position "yn" of a predetermined pixel of the output image being a center as the following expressions:

$$ymin=ft(yn-L); \text{ and}$$

$$ymax=ft(yn+L).$$

8. An image forming apparatus according to claim 1, wherein the transformation unit obtains the position of the pixel of the input image after the coordinate transformation with use of an inverse function $ft^{-1}(n)$ of a function $ft(n)$ by the following expression:

$$fs'(n)=ft'(ft^{-1}(fs(n)))$$

where:
- $fs(n)$ represents a function indicating a position of an n-th pixel in the first direction of the input image;
- $ft(n)$ represents a function indicating a position of the n-th pixel in the first direction of the output image;
- $fs'(n)$ represents a function indicating a position of the n-th pixel in the first direction of the input image after the coordinate transformation; and
- $ft'(n)$ represents a function indicating a position of the n-th pixel in the first direction of the output image after the coordinate transformation.

9. An image forming apparatus according to claim 5, wherein the transformation unit obtains, when the function $fs(n)$ satisfies $fs(n)=n$ and the function $ft'(n)$ satisfies $ft'(n)=n$, the position of the pixel of the input image after the coordinate transformation by the following expression:

$$fs'(n)=ft^{-1}(n).$$

10. An image forming apparatus according to claim 1, wherein the predetermined interval is determined in accordance with a resolution of image formation by the image forming apparatus.

\* \* \* \* \*